US009426431B2

(12) United States Patent
Julien et al.

(10) Patent No.: US 9,426,431 B2
(45) Date of Patent: Aug. 23, 2016

(54) LIVE PANNING SYSTEM AND METHOD FOR READING OUT A CROPPING WINDOW OF PIXELS FROM AN IMAGE SENSOR

(71) Applicant: TECHNOLOGIES HUMANWARE INC., Drummondville (CA)

(72) Inventors: Martin Julien, Brossard (CA); François Boutrouille, St-Lambert (CA); Stéphane Sicard, Montréal (CA)

(73) Assignee: Technologies Humanware Inc. (CA)

( * ) Notice: Subject to any disclaimer, the term of this patent is extended or adjusted under 35 U.S.C. 154(b) by 238 days.

(21) Appl. No.: 14/256,061

(22) Filed: Apr. 18, 2014

(65) Prior Publication Data
US 2014/0313329 A1   Oct. 23, 2014

Related U.S. Application Data

(60) Provisional application No. 61/814,455, filed on Apr. 22, 2013.

(51) Int. Cl.
H04N 7/18       (2006.01)
H04N 5/225     (2006.01)
H04N 5/232     (2006.01)
G09B 21/00     (2006.01)
G06T 3/00       (2006.01)
H04N 1/387     (2006.01)
(Continued)

(52) U.S. Cl.
CPC ............. *H04N 7/183* (2013.01); *G06T 3/0006* (2013.01); *G09B 21/008* (2013.01); *H04N 1/3873* (2013.01); *H04N 5/2259* (2013.01); *H04N 5/23296* (2013.01); *H04N 5/347* (2013.01); *H04N 5/3454* (2013.01)

(58) Field of Classification Search
CPC .. G06T 3/0006; G09B 21/008; H04N 1/3873; H04N 5/2259; H04N 5/23296; H04N 5/3454; H04N 5/347
See application file for complete search history.

(56) References Cited

U.S. PATENT DOCUMENTS

2002/0057279 A1* 5/2002 Jouppi ................. G06T 3/4038
                                                                   345/619
2002/0140845 A1* 10/2002 Yoshida ............... H04N 5/2354
                                                                   348/371
2002/0191031 A1* 12/2002 Ricard .................. G06F 3/0481
                                                                   715/838
(Continued)

FOREIGN PATENT DOCUMENTS

WO       0064140 A1    10/2000

*Primary Examiner* — Jay Patel
*Assistant Examiner* — Joseph Suh
(74) *Attorney, Agent, or Firm* — Hovey Williams LLP

(57) ABSTRACT

A live panning system and method for providing a live representation of a portion of a working area are provided. The system includes an image sensor acquiring an image of the entire working area and a processing unit. The image sensor includes an array of pixels, each providing pixel data of the image, and reads out the pixel data of a number of output pixels from the array to generate a sensor video stream, the output pixels corresponding to a cropping window within the image. The image sensor also includes a windowing module configured to move, in real-time, the cropping window within the image. The processing unit monitors viewing instructions from a user selecting a region of interest within the image corresponding to the portion of the working area, and dynamically communicates the viewing instructions to the windowing module such that the cropping window always encompasses the region of interest.

10 Claims, 20 Drawing Sheets

(51) Int. Cl.
*H04N 5/345* (2011.01)
*H04N 5/347* (2011.01)

(56) References Cited

U.S. PATENT DOCUMENTS

| | | | |
|---|---|---|---|
| 2003/0231355 A1* | 12/2003 | Ishikawa | H04N 1/00204 358/474 |
| 2004/0027462 A1* | 2/2004 | Hing | G01J 3/02 348/222.1 |
| 2004/0208394 A1* | 10/2004 | Kurata | G06K 9/00604 382/275 |
| 2004/0209642 A1* | 10/2004 | Kim | G06F 3/0362 455/550.1 |
| 2005/0162512 A1 | 7/2005 | Seakins | |
| 2006/0158523 A1* | 7/2006 | Estevez | H04N 5/23248 348/208.4 |
| 2006/0294477 A1* | 12/2006 | Cheng | H04N 21/41407 715/810 |
| 2007/0229660 A1 | 10/2007 | Yamaguchi | |
| 2009/0027337 A1* | 1/2009 | Hildreth | G06F 3/011 345/158 |
| 2009/0066647 A1* | 3/2009 | Kerr | G06F 3/0346 345/158 |
| 2010/0149364 A1* | 6/2010 | Kang | G02B 21/365 348/222.1 |
| 2011/0242326 A1* | 10/2011 | Essa | G06N 3/006 348/157 |
| 2012/0127329 A1* | 5/2012 | Voss | H04N 5/23267 348/208.4 |
| 2012/0257000 A1* | 10/2012 | Singhal | H04N 5/2256 348/14.02 |
| 2013/0128066 A1* | 5/2013 | Jin | G06T 7/0028 348/208.99 |
| 2013/0142381 A1* | 6/2013 | Field | G01J 3/28 382/100 |
| 2013/0173689 A1* | 7/2013 | Stonefield | H04L 65/605 709/203 |
| 2013/0222386 A1* | 8/2013 | Tannhauser | G06T 3/4038 345/428 |
| 2014/0028847 A1* | 1/2014 | Wang | H04N 7/18 348/148 |
| 2014/0301477 A1* | 10/2014 | Deshpande | H04N 19/70 375/240.25 |

* cited by examiner

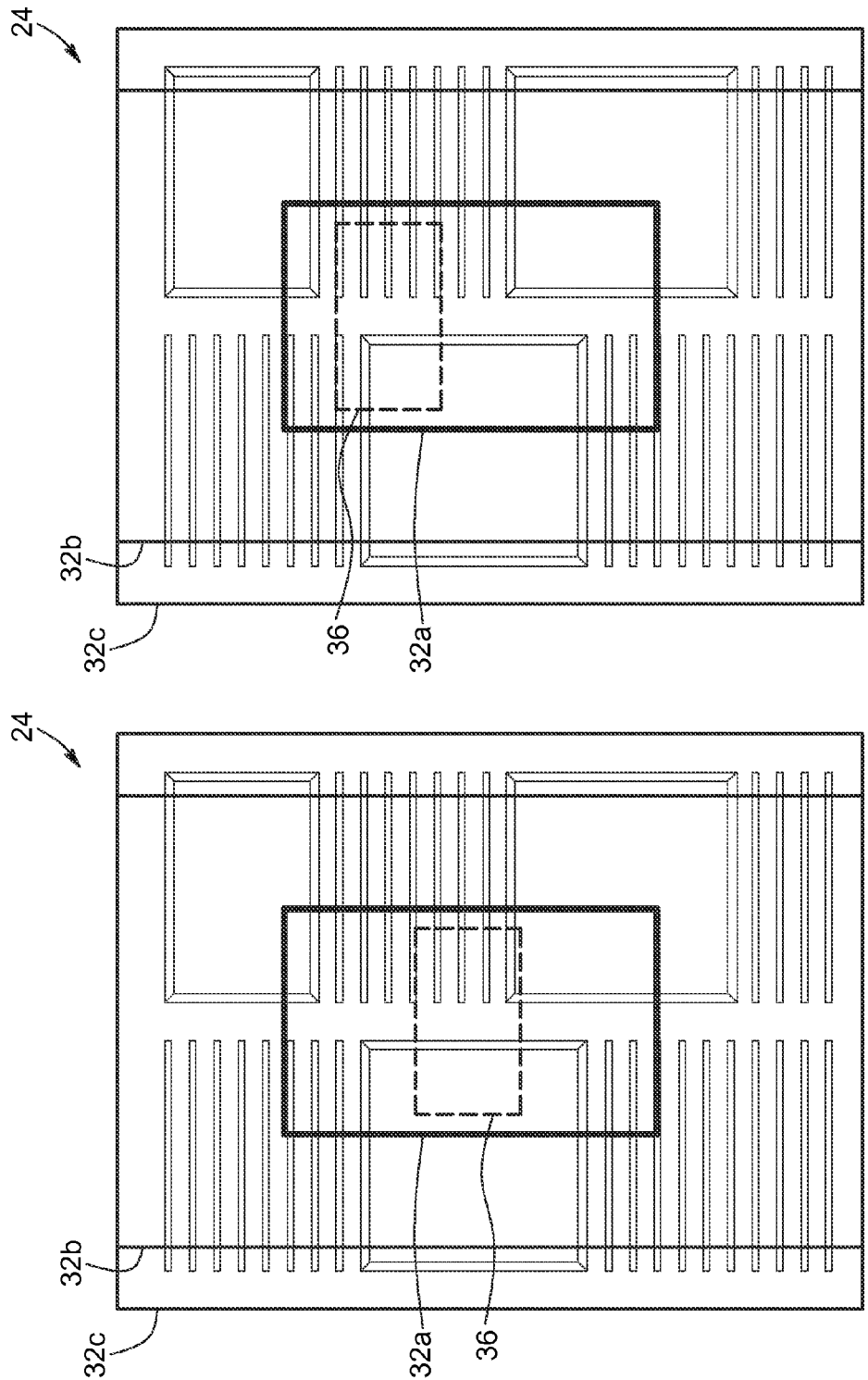

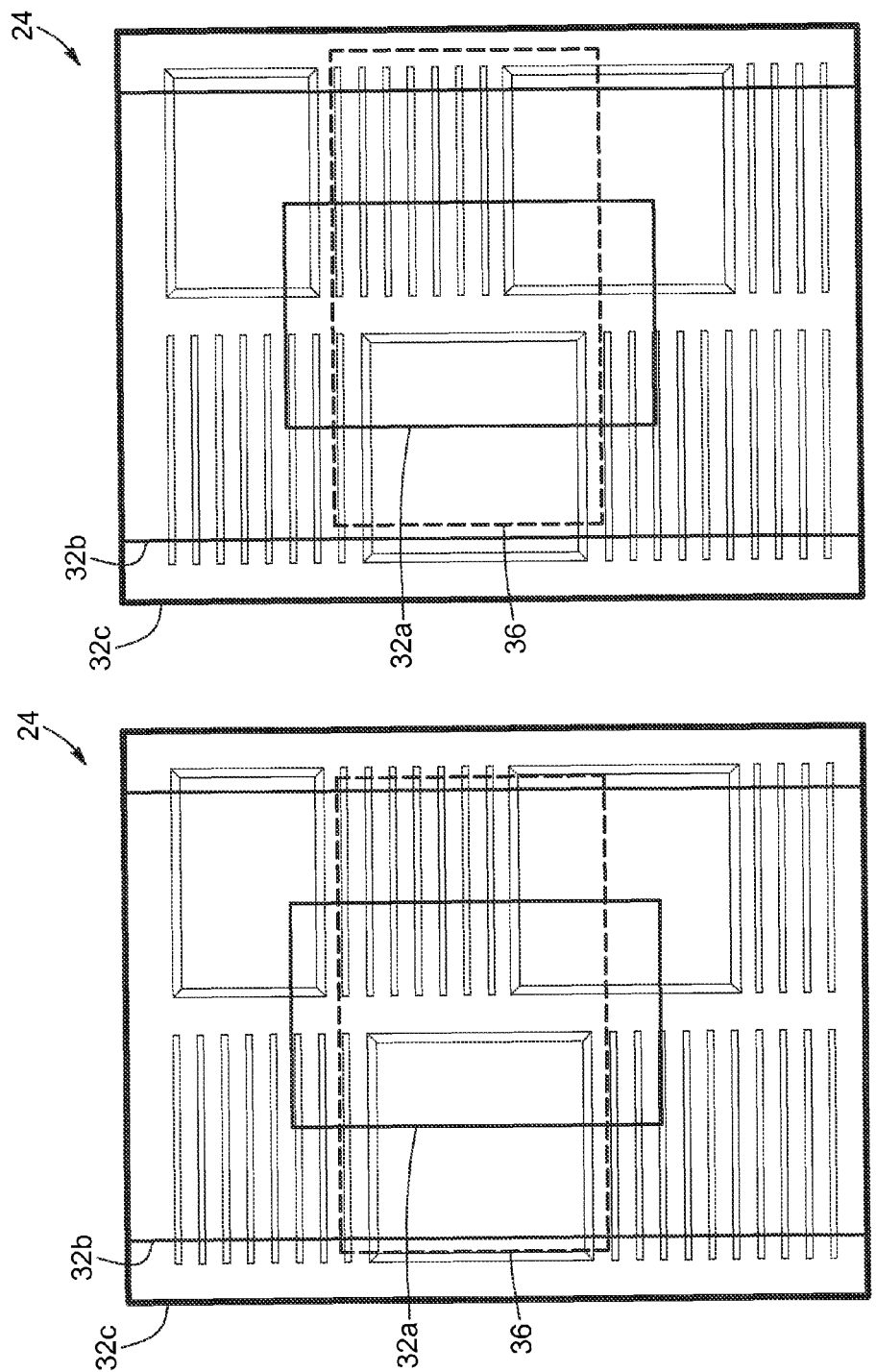

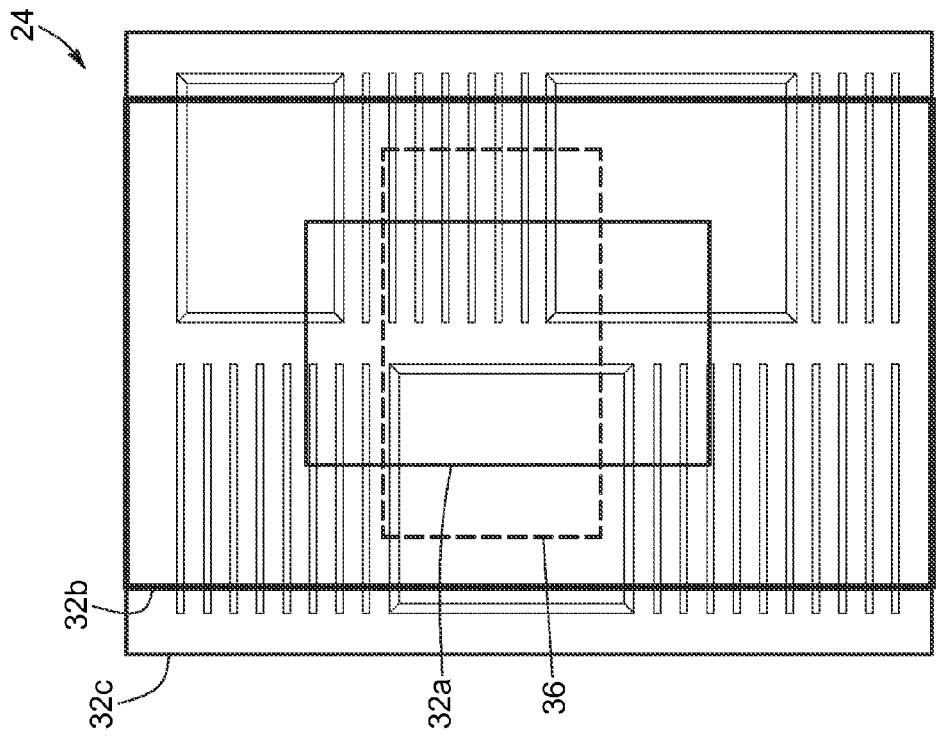
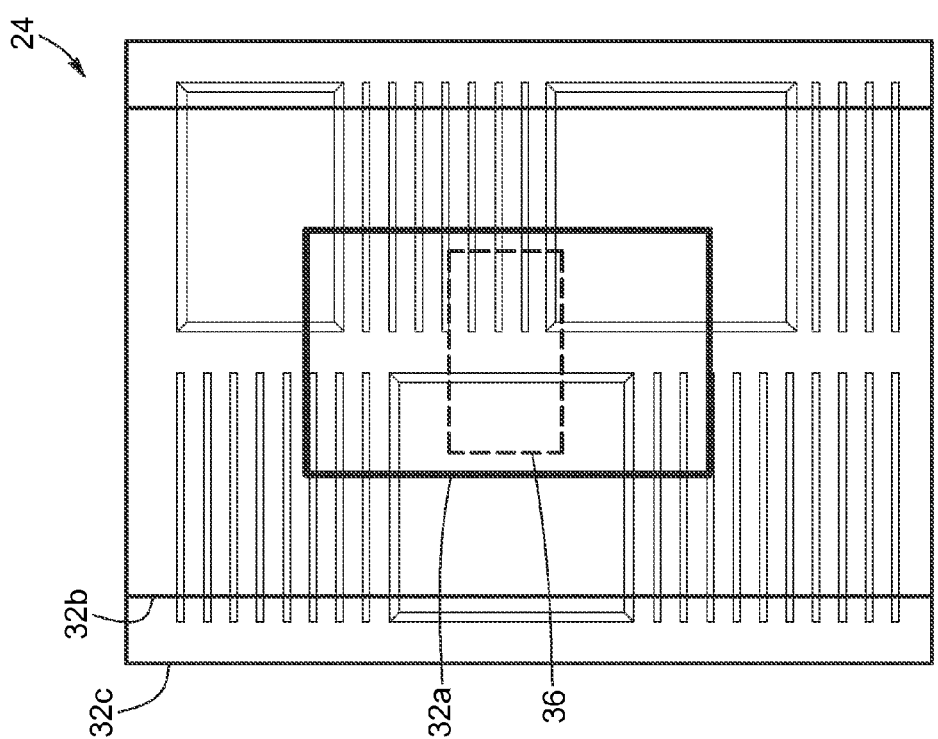
FIG. 9A
FIG. 9B

LIVE PANNING SYSTEM AND METHOD FOR READING OUT A CROPPING WINDOW OF PIXELS FROM AN IMAGE SENSOR

RELATED APPLICATION

This application claims priority benefit of a provisional application entitled, "LIVE PANNING SYSTEM AND METHOD," Ser. No. 61/814,455, filed Apr. 22, 2013 and incorporated by reference herein in its entirety.

TECHNICAL FIELD

The present invention generally relates to the field of imaging systems and methods, and more particularly concerns a system and a method for acquiring an image of an entire working area and providing therefrom a pannable live representation of a portion of the working area, suitable for use by low-vision individuals.

BACKGROUND

Loss of visual acuity is a growing concern worldwide. The World Health Organization currently estimates to 2.5% the incidence of low vision in industrialized countries and this figure is expected to continue to increase with ageing population. Low vision may be generally referred to as a condition where ordinary eye glasses, lens implants or contact lenses are not sufficient for providing sharp sight. The largest growing segment of the low-vision population in developed countries is expected to be people aged 65 years old and older. This is mainly due to age-related eye diseases such as macular degeneration, glaucoma and diabetic retinopathy, cataract, detached retina, and retinitis pigmentosa. Some people are also born with low vision.

Low-vision individuals often find it difficult, if not impossible, to read small writing or to discern small objects without high levels of magnification. This limits their ability to lead an independent life because reading glasses and magnifying glass typically cannot provide sufficient magnification for them. In order to assist low-vision individuals in performing daily tasks, various magnification devices and systems are known in the art.

Among such devices and systems, desktop video magnifiers generally include a video monitor mounted on a frame structure having a gooseneck shape. A camera provided with optical zooming capabilities is mounted on the frame structure and disposed so that the field of view of the camera intersects a working area on which a user can dispose an object of interest to be magnified. For example, the object may be a document including text content that the user wishes to read. The camera feeds a video processor with a video stream of a portion of the working area, and the video processor in turn feeds this video stream with an increased sharpness and enhanced contrast to the video monitor.

In conventional video magnifiers, the camera typically has a relatively narrow field of view and, therefore, can only acquire a video stream of a limited portion of the working area. In such cases, the user must displace the document with respect to the field of view of the camera in order to access different portions of the document. To assist the user in this task, the working area on which the document is placed is typically an XY translation table assembled on rails. Such a configuration allows the user to freely move the XY table and the document thereon to bring different portions of the document within the field of view of the camera. In other words, in conventional video magnifiers, panning across the image or video stream of the document may be achieved by moving the XY table and the document thereon with respect to the field of view of the camera. Moving the XY table is often considered a difficult task by users, because they must translate the table in a direction which is often considered counterintuitive. For example, to view the region at the left of the currently displayed image, the XY table must be moved to the right. Hence, panning in conventional video magnifiers is not considered optimal for certain applications, thereby negatively impacting the efficiency, functionality and ease-of-use of these devices.

In view of the above considerations, there is therefore a need in the art for an improved panning system and method that can be used more easily and conveniently by low-vision individuals or other users, while also alleviating at least some of the drawbacks of the prior art.

SUMMARY

In accordance with an aspect of the invention, there is provided a live panning system for providing a live representation of a portion of a working area. The live panning system includes an image sensor configured to acquire an image of the entire working area, the image sensor including:
an array of pixels each providing pixel data of the image, the image sensor being configured to read out the pixel data of a number of output pixels from the array of pixels at a sensor frame rate to generate a sensor video stream, the output pixels corresponding to a cropping window within the image; and
a windowing module configured to move, in real-time, the cropping window within the image; and
a processing unit monitoring viewing instructions from a user selecting a region of interest within the image corresponding to the portion of the working area, the processing unit dynamically communicating the viewing instructions to the windowing module such that the cropping window always encompasses the region of interest.

In accordance with another aspect of the invention, there is provided a live panning method for providing a live representation of a portion of a working area. The method includes the steps of:
a) acquiring an image of the entire working area;
b) generating a sensor video stream by reading out, at a sensor frame rate, a cropping window within the image;
c) monitoring viewing instructions from a user identifying a region of interest within the image corresponding to the portion of the working area; and
d) in view of the monitoring, moving, in real-time, the cropping window within the image such that the cropping window always encompasses the region of interest.

Other features and advantages of embodiments of the present invention will be better understood upon reading of preferred embodiments thereof with reference to the appended drawings.

BRIEF DESCRIPTION OF THE DRAWINGS

FIGS. 5A to 5D illustrate schematically an example of the live panning of a region of interest across an image of a working area, in accordance with an embodiment of the live panning system.

FIGS. 7A to 7C illustrate schematically another example of the live panning of a region of interest across an image of a working area, in accordance with an embodiment of the live panning system.

FIGS. 9A to 9D illustrate schematically an example of reducing the size of a region of interest of an image of a working area in response of zooming instructions from a user, in accordance with an embodiment of the live panning system.

DETAILED DESCRIPTION

Figure 1:
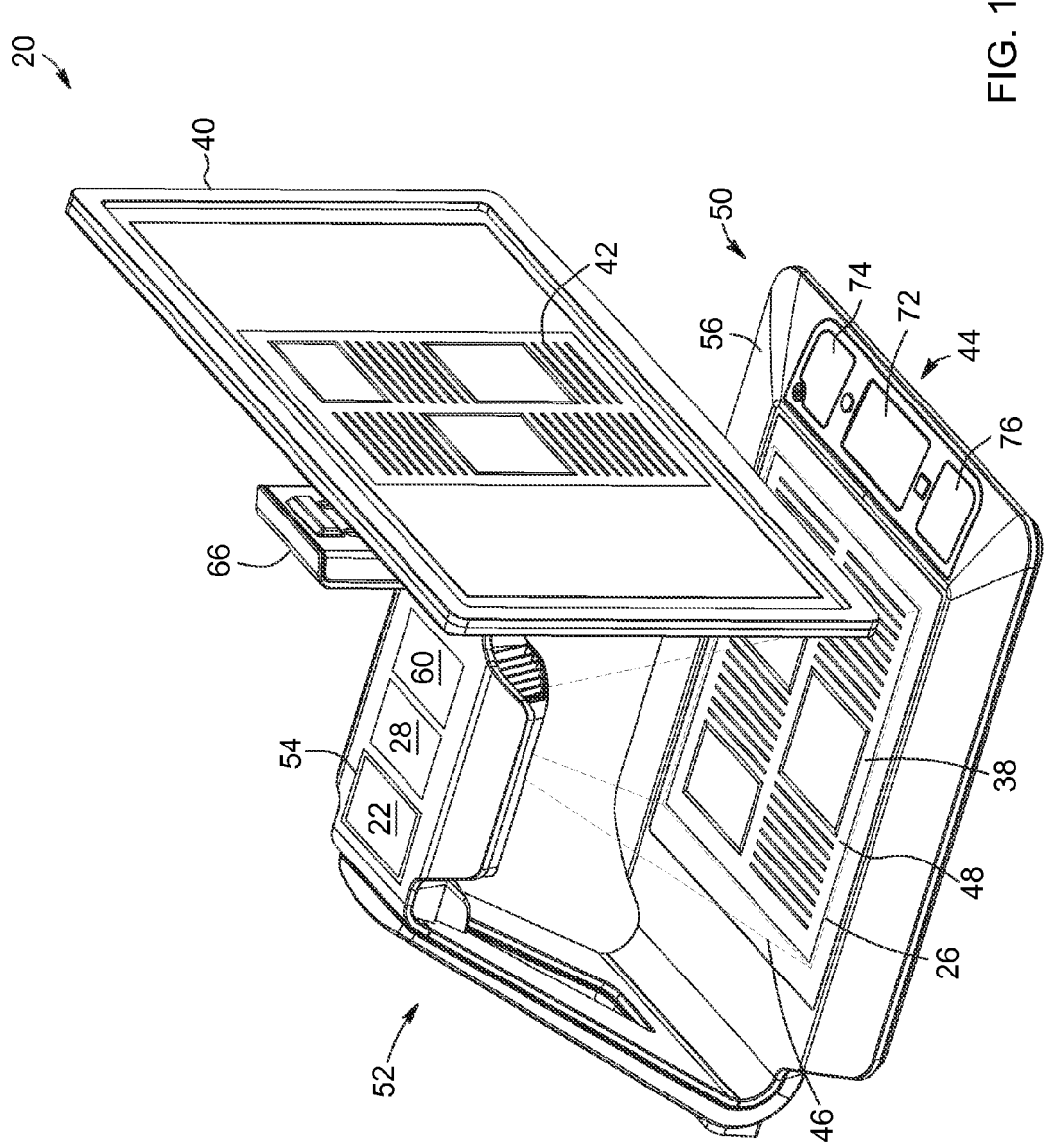
FIG. 1 is a schematic perspective side view of a live panning system for providing a live representation of a portion of a working area, in accordance with an embodiment.

In the following description, similar features in the drawings have been given similar reference numerals, and, in order to not unduly encumber the figures, some elements may not be indicated on some figures if they were already identified in preceding figures. It should also be understood herein that the elements of the drawings are not necessarily depicted to scale, since emphasis is placed upon clearly illustrating the elements and structures of the present embodiments.

The present description generally relates to a live panning system and method for providing a live representation of a portion of a working area.

Live Panning System

In accordance with an aspect of the invention, there is provided a live panning system for providing a live representation of a portion of a working area.

Figure 4:
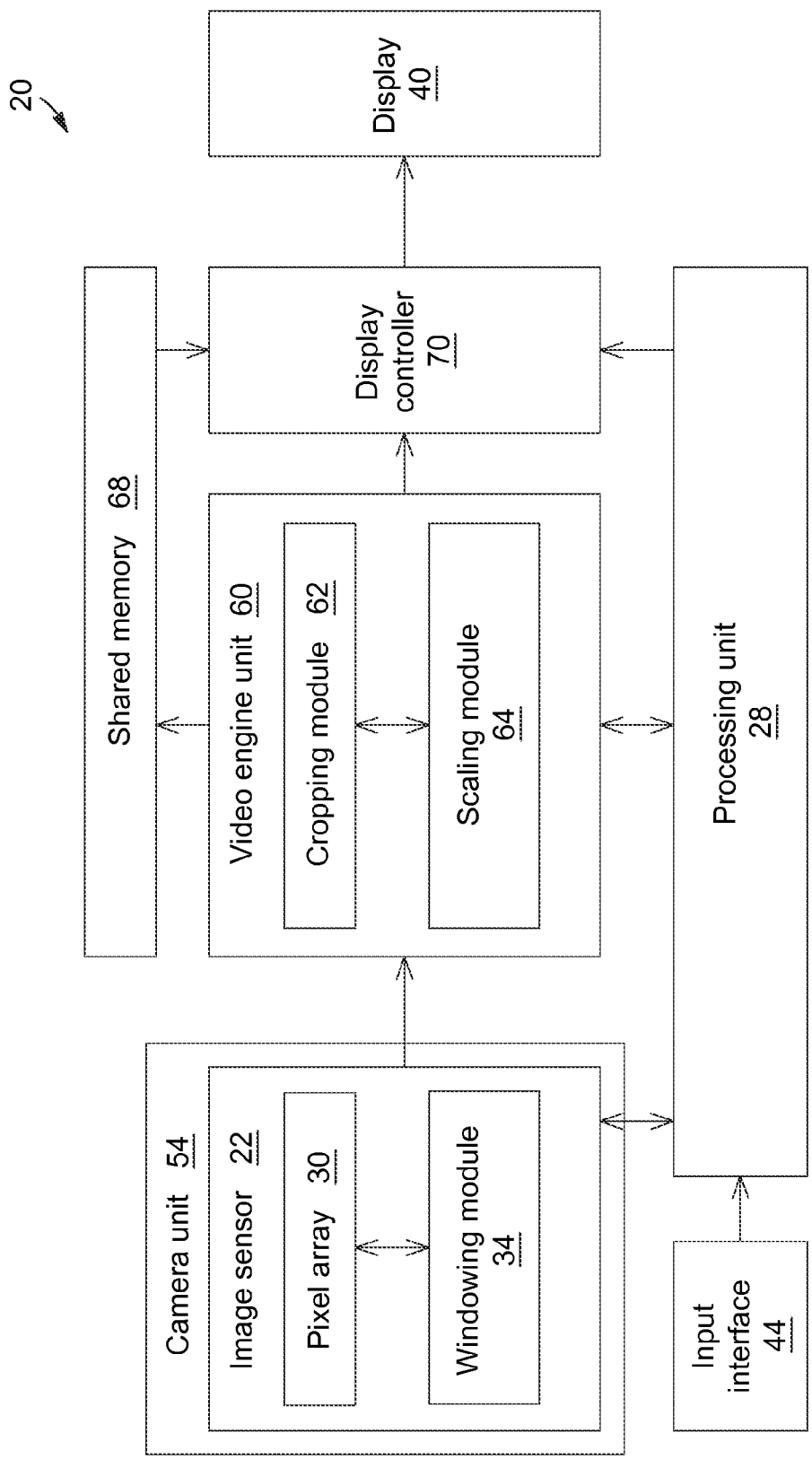
FIG. 4 is a schematic functional block diagram of a live panning system for providing a live representation of a portion of a working area, in accordance with the embodiment of FIG. 1.

Referring to FIGS. 1 and 4, a schematic perspective view and a schematic functional block diagram of a live panning system 20 according to an exemplary embodiment are shown. Broadly described, the live panning system 20 includes an image sensor 22 configured to acquire an image 24 (see, e.g., FIG. 5A) of the entire working area 26 and a processing unit 28 monitoring viewing instructions from a user selecting a region of interest 36 within the image 24 that corresponds to a portion 38 of the working area 26. It is to be noted that in FIG. 1, the portion 38 of the working area 26 corresponds to the entire working area 26. FIGS. 8A to 8C and 11A to 11D illustrate cases where the portion 38 of the working area 26 is less than the entire working area 26. The live panning system 20 may optionally include a display unit 40 displaying, in real-time and at a display frame rate, a live representation 42 of the region of interest 36 corresponding to the portion 38 of the working area 26. The live panning system may also include an input interface 44 in communication with the processing unit 28 to allow the user to act on the live representation 42 of the portion 38 of the working area 26.

As will be discussed in greater detail below, the live panning system according to embodiments of the invention may be particularly useful in video magnifiers directed to individuals suffering from low vision or other visual impairments, such as the one illustrated in FIG. 1. Conventional video magnifiers for low-vision individuals generally involve displacing the working area to bring different portions of the working area within the field of view of the image sensor. For at least this reason, panning in conventional video magnifiers may be cumbersome or inefficient, leading to degradation in performance and usability. To help address this situation, embodiments of the live panning system can achieve panning without the user having to physically or mechanically move the image sensor and the working area relative to each other.

Figure 8A:
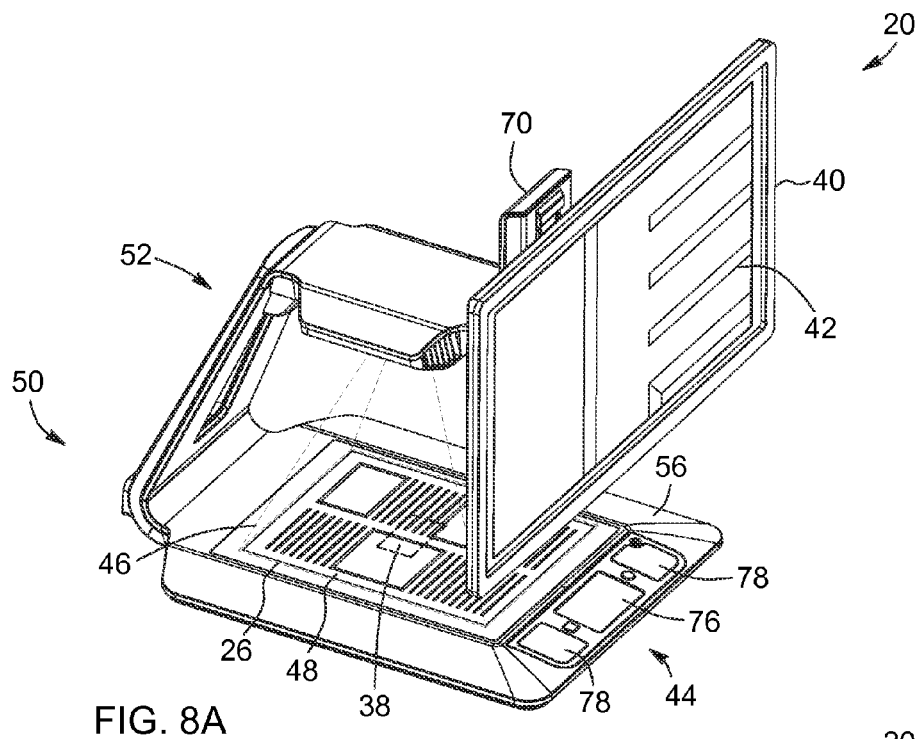
FIGS. 8A to 8C are schematic perspective side views of a live panning system for providing a live representation of a portion of a working area, in accordance with an embodiment, wherein the live representations provided in FIGS. 8A to 8C correspond to the regions of interest identified in FIGS. 5A, 5B and 5D, respectively.
Figure 8B:
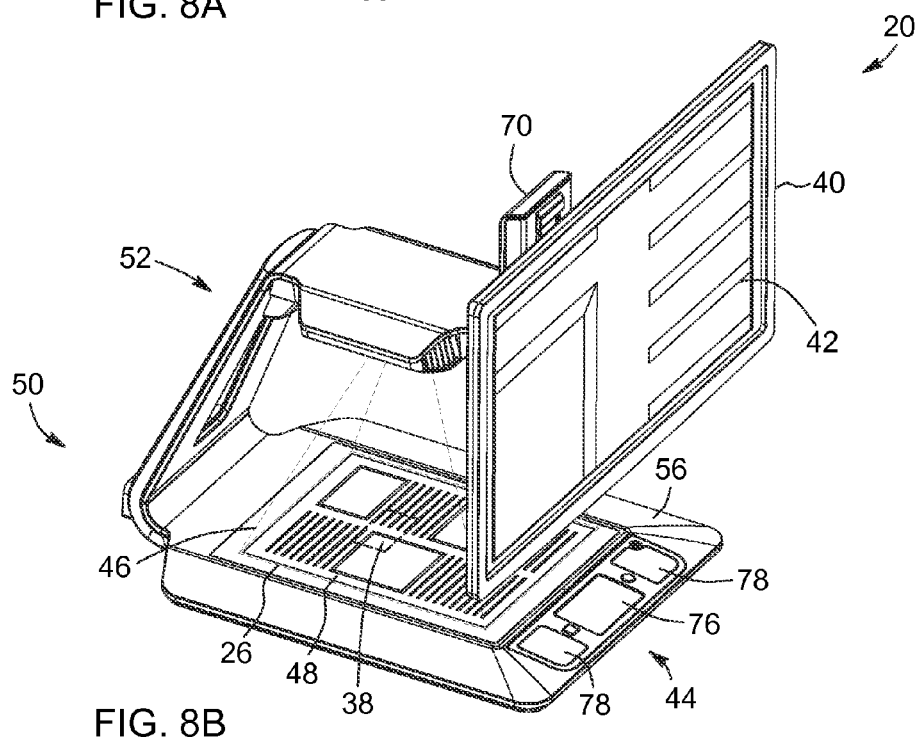
Figure 8C:
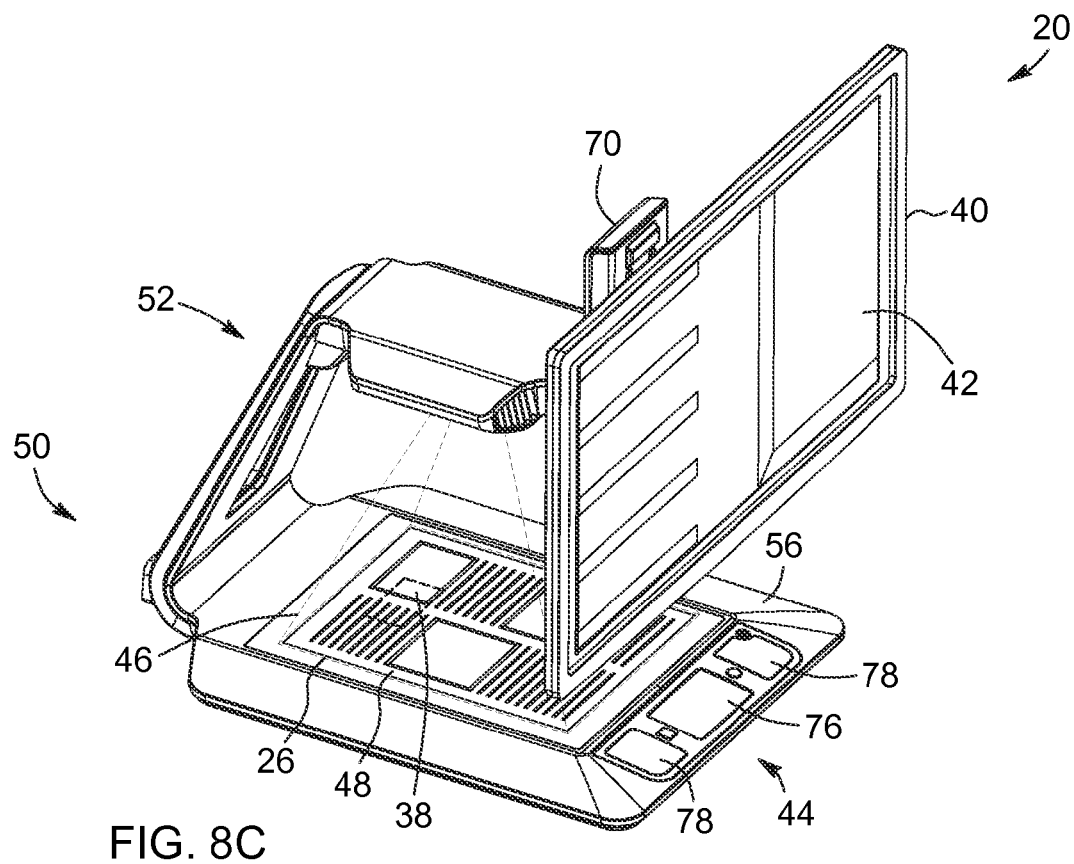

Throughout the present description, the term "panning" generally refers to an operation where the region of interest in an image of the entire working area is moved by scanning or moving across the image. In particular, the panning across an image results in a translation of the region of interest within the image, thereby displaying or presenting different portions of the working area to a user. For example, FIGS. 8A to 8C illustrate the effect of panning the region of interest 36 within the image 24 at a given magnification level to bring into view different portions 38 of the working area 26 on the display unit 40, in response to panning commands depicted schematically in FIGS. 5A to 5D.

As used herein, the term "magnification level" is understood to refer to the ratio of the live representation of the portion of working area displayed by the live panning system to the actual size of the portion of the working area. It will be understood that the portion 38 of the working area 26 may correspond to the entire the working area 26 (see, e.g., FIG. 1) or to a partial region thereof (see, e.g., FIGS. 8A to 8C).

It is to be noted that in FIGS. 5A to 5D and 8A to 8C, panning across the image 24 to display different portions 38 of the working area 26 is performed without displacing a field of view 46 of the image sensor 22 with respect to the working area 26. Indeed, in contrast to the mechanical panning system employed in conventional video magnifiers, the live panning system according to embodiments of the invention corresponds to a digital panning of the image acquired by the image sensor. As used herein, the term "digital panning" involves a user moving, in real-time, the region of interest corresponding to the portion of the working area within the image of the entire working area, without having to physically displace the field of view of the image sensor with respect to the working area.

The terms "live" and "real-time" are used herein as practical terms depending upon the requirements or particularities of an intended application of the live panning system. These terms generally refer to the fact that the live panning system allows panning operations to be performed on the image relatively seamlessly on the typical scale of human perception. As a result, the live representation of the portion of the working area corresponding to the region of interest of the image is provided to the user with negligible, insignificant or acceptable time lag or delay.

Figure 2:
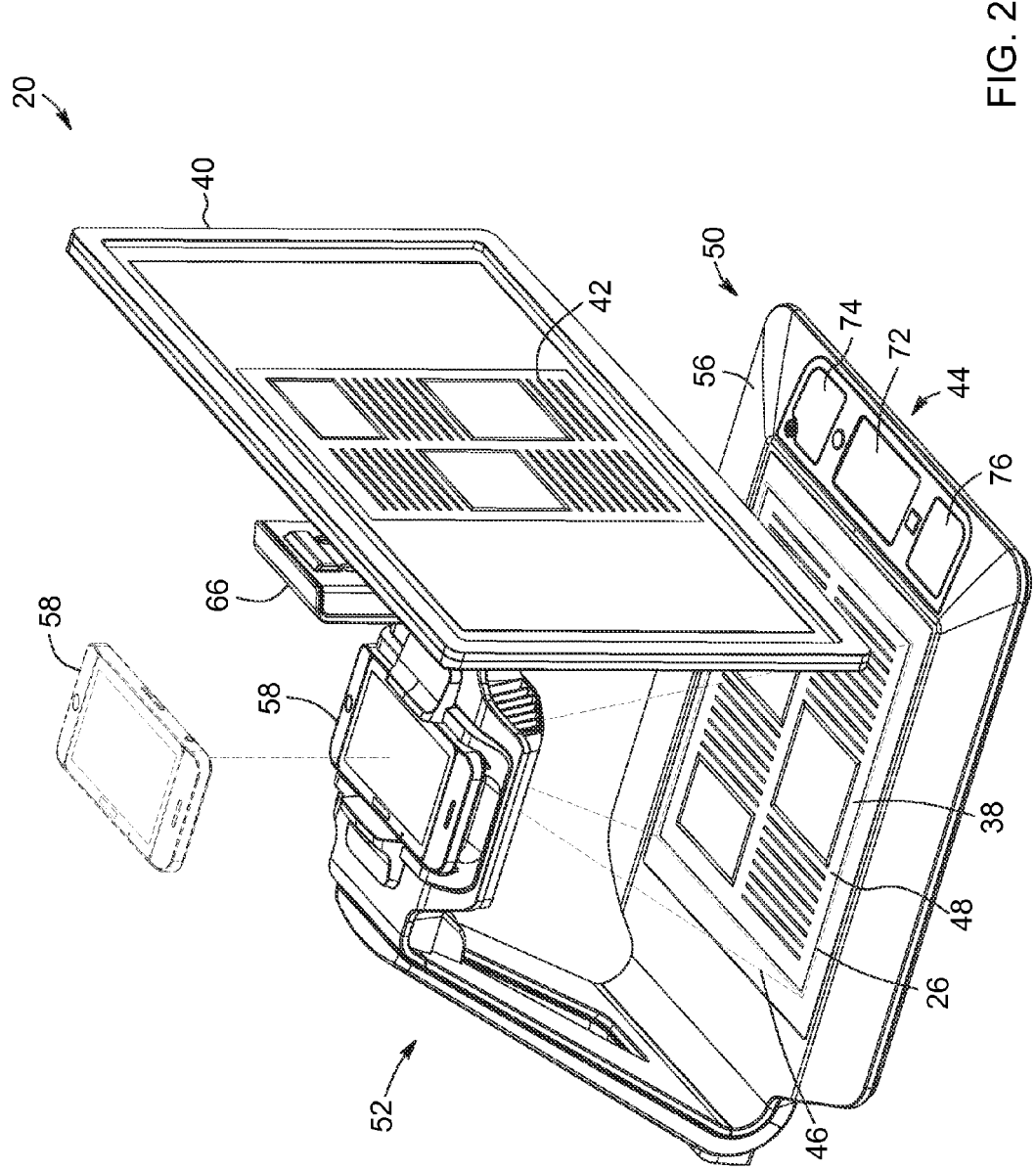
FIG. 2 is a schematic perspective side view of a live panning system for providing a live representation of a portion of a working area, in accordance with another embodiment.

The term "working area" is meant to refer to any physical structure, surface or region encompassed within the field of view of the image sensor and of which a portion is to be provided as the live representation by the live panning system. In some embodiments, such as shown in FIGS. 1 and 2, the working area 26 is a generally flat surface on which can be placed an object 48, for example a printed document that a user wishes to read. Typical objects may include, without being limited to, printed and handwritten documents, books, magazines, newspapers, letters, bills and checks, but also any three-dimensional object of interest. One of ordinary skill in the art will understand that the terms "working area" and "object" are not intended to be restrictive.

It is to be noted that although some embodiments of the invention may be targeted or well adapted to low-vision individuals, one of ordinary skill in the art will understand that embodiments of the invention can, in general, be used by any person desiring a device capable of panning across an image of a working area in real-time and without having to move the working area with respect to the field of view of the image sensor, and vice versa.

In the embodiment of FIG. 1, the live panning system 20 includes a base station 50 provided with a frame structure 52 having a gooseneck shape and on which is mounted the display unit 40. A camera unit 54 incorporating the image sensor 22 is mounted on the frame structure 52 and disposed such that the field of view 46 of the image sensor 22 circumscribes or encompasses the entire working area 26 on which a user can dispose an object 48 whose live representation 42 is to be displayed on the display unit 40. In the embodiment of FIG. 1, the live panning system 20 is intended to be used a stand-alone device such that the image sensor 22 and the processing unit 28 are integrally provided within the frame structure 52.

In the embodiment of FIG. 1, the frame structure 52 includes a bottom platform 56 adapted to be disposed on a flat surface such as a table, desk, counter, or the like. The bottom platform 56 is shown as having a rectangular shape, but one of ordinary skill in the art will understand that other shapes could be considered in other embodiments. A region of the bottom platform 56 on which an object 48 (e.g., a document) can be disposed can define the working area 26. In such a case, the working area 26 can be said to coincide, at least partly, with the intersection plane between the bottom platform 56 and the field of view 46 of the image sensor 22 of the live panning system 20. In some embodiments, the entire bottom platform 56 may define the working area 26. In other embodiments, the frame structure 52 need not include a bottom platform 56, such that the object 48 to be viewed can rest on a flat surface on which the base station 50 is supported or on another flat surface. In such a case, the working area 26 coincides at least partly with this flat surface.

In other embodiments, the live panning system 20 including the image sensor 22 and the processing unit 28 may be provided in a handheld device 58. An example of such a handheld device is described in patent application Ser. No. 13/724,964 entitled "Handheld magnification device with a two-camera module", the contents of which are incorporated herein by reference in their entirety. In some of these embodiments, such as that shown in FIG. 3, the handheld device 58 may be used as a standalone portable device. However, in other embodiments, the handheld device 58 may alternatively or additionally be connectable for use in combination with stationary equipment. For example, in some embodiments, such as in FIG. 2, the handheld device 58 incorporating the live panning system 20 according to embodiments of the invention could be removably docked to the frame structure 52 of a base station 50. An example of such a modular magnification system is described in patent application Ser. No. 13/724,896 entitled "Magnification system", the contents of which are incorporated herein by reference in their entirety.

Image Sensor

Referring back to FIG. 1, the live panning system 20 includes an image sensor 22 configured to acquire an image of the entire working area 26. An example of such an image 24 of the entire working area 26 is shown in FIG. 5A.

In FIG. 1, the image sensor 22 is part of the camera unit 54 mounted on the frame structure 52 of the base station 50. The camera unit 54 is disposed over the working area 26 such that the field of view 46 of the image sensor 22 encompasses the entire working area 26. Preferably, the working area 26 encompassed by the field of view 46 of the image sensor 22 is sufficiently large to allow the image 24 of the entire surface of a document having a standard letter size to be acquired at a distance of less than about 25 cm. As known in the art, standard paper sizes include, without being limited to, Letter (215.9 mm×279.4 mm), A3 (297 mm×420 mm), A4 (210 mm×297 mm), A5 (148 mm×210 mm), and the like. One of ordinary skill in the art will appreciate that these values and ranges are provided for illustrative purposes only and that embodiments of the live panning system may operate outside these ranges.

The term "camera unit" refers herein to any component or combination of components capable of acquiring an image of a scene. More particularly, the term "camera unit" is meant to encompass the imaging elements, including imaging optics and the image sensor, as well as the camera circuitry associated therewith, which are collectively used to acquire the image of the entire working area. In some embodiments, the camera unit is preferably a high-resolution digital camera, for example 1 megapixel or higher, although lower resolution cameras or non-digital devices may be used without departing from the scope of the present invention.

The term "image sensor" generally refers herein to any photosensitive device able to detect optical radiation emitted by, reflected by or otherwise emanating from an object or scene, and to generate an image of the object or scene based on the detected optical radiation. The image sensor 22 can be embodied by complementary metal-oxide-semiconductor (CMOS) or charge-coupled device (CCD) pixel sensors, but other types of image sensors (e.g., charge injection devices or photo diode arrays) could be used without departing from the scope of the present invention.

Figure 3:
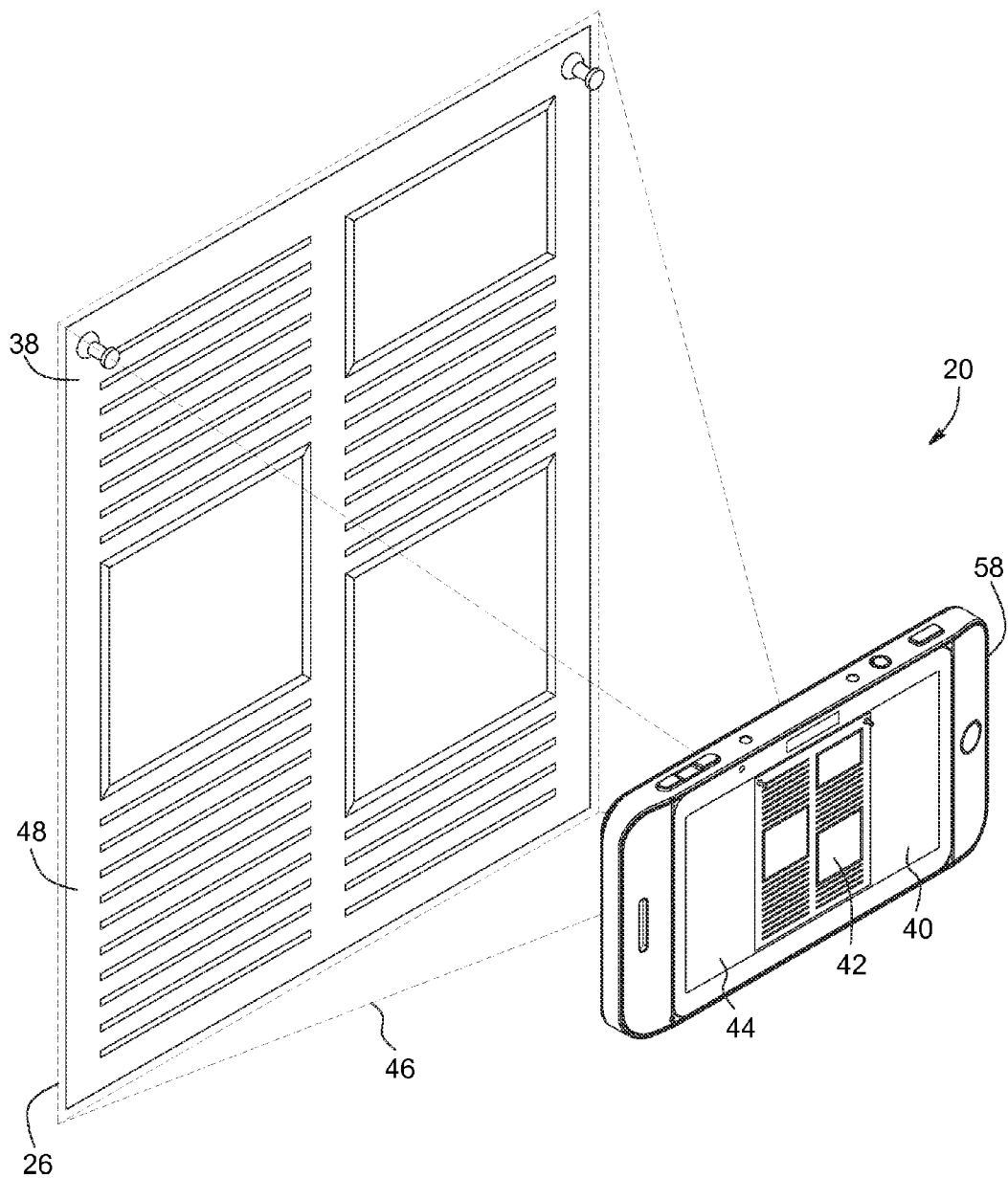
FIG. 3 is a schematic perspective side view of a live panning system for providing a live representation of a portion of a working area, in accordance with another embodiment.

Referring to FIGS. 1 to 3, the image sensor 22 has a field of view 46 directed and extending toward the working area 26. As used herein, the term "field of view" generally refers to the solid angular extent of a given scene whose image is to be acquired by the image sensor. In the embodiments of FIGS. 1 to 3 the field of view 46 is rectangular but other shapes are possible in other embodiments.

Referring to FIG. 4, the image sensor 22 includes an array 30 of pixels, wherein each pixel provides pixel data of the image 24. The pixel array 30 defines the optically active area of the image sensor 22, such that upon striking the pixel array 30, optical radiation is converted into electrical energy and stored as individual pixel data. In other words the image sensor 22 is adapted to receive optical radiation from the working area 26 and to convert the same into electrical data representing the image 24 of the working area 26.

As used herein, the term "pixel" generally refers to an individual imaging element of the image sensor. Each pixel consists of a photodetector for sensing light, which is generally coupled to a readout circuit. Preferably, each pixel of the array can be addressed and read individually. However, as known in the art, the term "pixel" is also commonly used to refer to a fraction of an image. Both meanings of the term will be used herein and it will be clear from the context which meaning is intended. The term "pixel data" refers to information or data captured and associated with a given pixel of the array and may include, without being limited to, intensity data indicative of the total amount of optical energy striking a pixel of the array over a period of time.

The pixel array 30 may be physically organized into rows and columns of pixels, the number of which defines the resolution of the image sensor 22 and, thus, the resolution of the image 24 acquired by the image sensor 22. As used herein, the term "resolution" and "pixel resolution" can be expressed as a set of two positive integer numbers representation dimensions (e.g., width and height), where the first number is the number of pixel columns (e.g., width) in the image or array and the second is the number of pixel rows (e.g., height) in the image or array. The resolution or pixel resolution can alternatively be expressed in terms of the total number of pixels in the image or array, typically given as number of megapixels, which can be calculated by multiplying the number of pixel columns by the number of pixel rows and dividing by one million. In some embodiments, the image sensor 22 may have a resolution of at least 5 megapixels. In one example, the image sensor 22 has a resolution of 8 megapixels arranged in an array of 3264×2448 pixels, which also corresponds to the pixel resolution of the image 24 acquired by the image sensor 22 shown, for example, in FIGS. 5A to 7C and 9A to 10D. However, it is to be understood that embodiments of the live panning system are not limited by the resolution of the pixel array of the image sensor and that numerous resolution values are understood to be encompassed within the scope of the present invention.

Referring back to FIG. 4, the image sensor 22 of the live panning system 20 is configured to read out the pixel data of a number of output pixels from the pixel array 30 at a sensor frame rate to generate a sensor video stream, the output pixels corresponding to a cropping window within the image. In other words, the cropping window represents one frame of the sensor video stream outputted by the image sensor 22. The sensor frame rate is preferably equal to 30 or, further preferably, to 60 frames per second (fps) in order to provide a live representation of the portion of the working area that remains fluid from the perspective of the human eye. Of course, any other appropriate values may be used for the sensor frame rate without departing from the scope of the present invention.

The image sensor 22 can be configured to output the cropping window in one of a plurality of pixel resolutions (i.e., size and shape) and sensor frame rates depending, inter alia, on the physical limitations of the image sensor 22 and the performance requirements of the intended application, as will be discussed in greater detail below. In this regard, FIGS. 5A to 7C and 9A to 10D show three different cropping windows 32a to 32c that can be read out from the image 24 of the working area and outputted by the image sensor. Each cropping window 32a to 32c has a different size, thus corresponding to a different number of the output pixels being outputted by the image sensor. As exemplified in FIGS. 5A to 7C and 9A to 10D, the cropping window 32a to 32c may correspond to the entire image 24 of the working area (e.g., cropping window 32c) or to a partial region thereof (e.g., cropping windows 32a and 32b). It will be understood that, the image sensor may be configured to output the cropping window in any one of a plurality of pixel resolutions, which may differ from those of the exemplary cropping windows 32a to 32c illustrated in FIGS. 5A to 7C and 9A to 10D.

In addition to allowing a control over the pixel resolution (i.e., size and shape) of the cropping window 32a to 32c, embodiments of the present invention also enable the displacement of the cropping window 32a to 32c within the image 24 of the entire working area 26. To achieve this control, the image sensor 22 includes a windowing module 34 configured to move, in real-time, the cropping window 32a to 32c within the image 24 of the working area 26. In other words, the windowing module 34 allows both a digital and live panning of the cropping window 32a to 32c across the image 24 by outputting, in real-time, the output pixels of the array 30 corresponding to the desired cropping window 32a to 32c.

The benefit, in some embodiments, of outputting a cropping window which is smaller than the image of the entire working area and of being able to modify, in real-time, the size, shape and position of the cropping window will be discussed in greater detail below, after the description of other components of the live panning system.

Processing Unit

Referring back to FIG. 4, the live panning system 20 also includes a processing unit 28.

Throughout the present description, the term "processing unit" is understood to refer to a functional entity of the live panning system that monitors viewing instructions from a user selecting a region of interest within the image and that communicates those viewing instructions to various elements of the live panning system. In some embodiments, in addition to monitoring and communicating viewing instructions, the processing unit may also control and execute, at least partially, the operations required to provide the live representation of the portion of the working area. In particular, as illustrated in FIG. 4, the processing unit 28 is preferably connected to various elements of the live panning system 20 such as the image sensor 22 and the display unit 40 via various input/output (I/O) communication ports, such as camera ports and display ports.

It will be understood by one of ordinary skill in the art that the processing unit 28 may be implemented as a single unit or a plurality of interconnected processing sub-units and may be embodied by or be part of a microprocessor, a central processing unit (CPU), a processing core, a microcontroller, a system on a chip (SoC), a digital signal processor (DSP), a programmable logic device, or by any other processing resource or any combination of such processing resources configured to operate collectively as a processing unit. In particular, this terminology should not be construed so as to limit the scope or application of the invention.

It will also be understood that, in practice, the processing unit 28 may include a plurality of modules, sub-modules, routines, components, communication ports, software and the like cooperating together in order to accomplish a particular function. It will be further understood that the subdivision into such modules is made from a conceptual standpoint only and that, in practice, a given hardware or software component may be shared by different modules, and that components of different modules may be combined together physically or logically without departing from the scope of the present invention. The various physical components of the processing unit 28 and the interconnections therebetween can be disposed on an integrated circuit (IC) die, which can be mounted onto a printed circuit board (PCB).

Broadly described, the processing unit 28 of FIG. 4 is configured to monitor and receive requests and instructions from a user, preferably via an input interface 44 such as the one shown in FIG. 1. The processing unit 28 analyzes the requests and communicates with and/or instructs the different modules and components of the live panning system 20 to provide the desired live representation of the portion of the working area. In particular, the processing unit 28 monitors viewing instructions from the user selecting a region of interest within the image, which corresponds to the portion of the working area.

Throughout the present description, the term "region of interest" refers to a region of the image of the working area (e.g., an area in pixels×pixels of the image) that contains information of interest to a user. It will be understood that the region of interest may correspond to a fraction or the entirety of the image of the working area. More specifically, the region of interest 36 in FIGS. 5A, 5B and 5D corresponds respectively to the portion 38 of the working area 26 of FIGS. 8A to 8C whose live representation 42 is provided to the user as a magnified video stream on the display unit 40. Throughout the drawings, as seen in FIGS. 5A to 7C and 9A to 10D described below, the region of interest 36 is outlined by a dashed rectangle inscribed in the image 24 of the working area 26. However, the region of interest 36 may assume other shapes in other embodiments.

Referring back to FIG. 4, while monitoring the viewing instructions from a user, the processing unit 28 dynamically communicates with the windowing module 34 such that the cropping window 32a to 32c outputted by the image sensor 22 always encompasses the region of interest 36, as shown in FIGS. 5A to 7C and 9A to 10D described below. For example, when the user requests to view a particular region of interest 36 of the image 24 that is located, at least partially, outside of the cropping window 32a currently outputted by the image sensor 22 (see, e.g., FIG. 5C), the processing unit 28 will transmit that information, in real-time, to the windowing module 34 of the image sensor 22. In response, the windowing module 34 will move the cropping window 32a within the image 24 until the cropping window 34 encompasses the new region of interest 36 (see, e.g., FIG. 5D). In particular, in response to viewing instructions from the user, the processing unit 28 communicates with the windowing module 34, which in turn outputs the requested pixels of the pixel array 30 to form the cropping window 32a to 32c.

In addition, when the size of the region of interest is enlarged, for example in response to zooming instructions from the user, to a point where it cannot be fitted inside the current cropping window solely by panning the cropping window across the image, the processing unit can communicate that information to the windowing module, which in turn will increase the size of the cropping window outputted thereby. More specifically, in response to viewing instructions from a user selecting a size for the region of interest and upon receiving these viewing instructions from the processing unit 28, the windowing module 34 may be configured to change, in real-time, a size of the cropping window such that the cropping window always encompasses the region of interest. This is exemplified in FIGS. 9A to 9D, where the cropping window outputted by the image sensor changes from the cropping window 32a to the cropping window 32c in response to instructions received from the user to increase the size of the region of interest 36.

It is to be noted that while in some embodiments the processing unit is limited to communicating the viewing instructions entered by the user to the windowing module, in other embodiments, the processing unit can also instruct and/or control, at least partially, the windowing module to move and/or change the size of the cropping window. Additionally, it is to be understood that the processing unit can communicate the viewing instructions received from the user either directly to the windowing module or via one or more intermediate components of the live panning system.

Video Engine Unit

Referring back to FIG. 4, the live panning system 20 may also include a video engine unit 60.

The video engine unit 60 is in communication with the image sensor 22 and receives therefrom the pixel data of the output pixels corresponding to the cropping window outputted by the image sensor 22. The video engine unit 60 is configured to read out, in real-time, the pixel data of a number of pixels of interest from the output pixels to generate a video stream of interest. In particular, the pixels of interest corresponds to the region of interest 36 of the image 24 which is identified by the user, as shown in FIGS. 5A to 7C and 9A to 10D. It will be understood that the video engine unit 60 preferably outputs the video stream of interest at a frame rate equal to the frame rate of the sensor video stream which, as mentioned above, may but need not be equal to 30 or 60 fps. It will also be understood that the operations performed by the video engine unit are based on the viewing instructions received from the processing unit. Furthermore, in some embodiments, the processing unit not only communicates the viewing instructions to the video engine unit but can also trigger and control, at least to some extent, the operations executed by the video engine unit. Additionally, in other embodiments, the processing unit may communicate with the windowing module of the image sensor indirectly via the video engine unit (i.e., in such embodiments, the processing unit would not be in direct communication with the windowing module of the image sensor).

The video engine unit is described below as including different modules, each associated with one or more different functions. It will be readily understood by one of ordinary skill in the art that, in practice, each module may include a plurality of sub-modules, routines, components, communication ports, software and the like cooperating together in order to accomplish the corresponding function. As for the processing unit described above, it will be understood that the video engine unit may be implemented as a single unit or a plurality of interconnected processing sub-units configured to operate collectively as a video engine unit. Typical modern video engines are imaging systems composed of both hardware and software modules. Hardware modules are dedicated to various image processing tasks (video conversion, noise filtering, scaling) whereas software modules allow configuration of the hardware modules and sequencing of the imaging operations in a real-time operating system environment. It will be further understood that the subdivision into specific modules is made from a conceptual standpoint only and that, in practice, a given hardware or software component may be shared by different modules, and that components of different modules may be combined together physically and logically without departing from the scope of the present invention.

In FIG. 4, the video engine unit 60 includes a cropping module 62 and a scaling module 64, both of which are in communication with the processing unit 28.

In FIG. 4, the cropping module 62 corresponds to the functional entity of the video engine unit 60 that receives, for example over a CSI-2 bus, the cropping window from the image sensor 22 and that crops, in response to the viewing instructions received from the processing unit 28, the cropping window such that only the pixels corresponding to the region of interest 36 are kept in the video stream of interest. The cropping module 62 can move, in real-time, the region of interest 36 within the cropping window on account of a request from the user panning the region of interest 36 across the image 24. In other words, the cropping module 62 of the video engine unit 60 makes it possible to digitally and dynamically pan the region of interest within the cropping window across the image by outputting, in real-time, the required output pixels of the array 30 to form the desired cropping window. The panning capabilities offered by the cropping module 62 will be described in greater detail below with reference to FIGS. 5A to 8C.

The cropping module 62 may be also configured to change, in real-time, a size of the region of interest within the cropping window on account of viewing instructions from the user. For example, the cropping module 62 may be configured to reduce or enlarge, in real-time, the size of the region of interest within the cropping window on account of zooming instructions from the user. The zooming capabilities offered by the cropping module 62 will be described in greater detail below in reference to FIGS. 9A to 11D.

The pixels of interest outputted by the cropping module 62 as the video stream of interest are received by the scaling module 64. The scaling module 64 is configured to scale the video stream of interest in accordance with a pixel resolution supported by the display unit 40. The scaling module 64 may for example be embodied by devices known as resizers, or scalers. The scaling module 64 may be in charge of the data buffering, horizontal and vertical rescaling (for example upscaling for a zoom-in operation or down-scaling for zoom-out operation) and output generation. It will be understood that in some embodiments, the cropping module 62 and the scaling module 64 may be embodied by the same physical module.

Display Unit

Referring back to FIGS. 1 to 4 the live panning system 20 may further include a display unit 40. The display unit 40 displays, in real-time and at a display frame rate, a magnified video stream of the region of interest identified by the user. In the illustrated embodiment, the magnified video stream is based on the video stream of interest generated by the video engine unit 60, and thus on the sensor video stream generated by the image sensor 22. The magnified video stream displayed by the display unit 40 corresponds to the live representation 42 of the portion 38 of the working area 26.

In the embodiment of FIGS. 1 and 2, the display unit 40 is a monitor mounted on a display support 66 of the frame structure 52. The display unit 40 may be embodied by any type of display technology, such as liquid crystal display (LCD), light-emitting diode (LED), organic LED (OLED), plasma display panel (PDP), light-emitting polymer display (LPD) or active-matrix OLED (AMOLED) technology. For example, the display unit 40 in FIGS. 1 and 2 can be embodied by a monitor using LCD display technology with LED backlight and having a 50.8-centimeter (i.e., 20-inch) or 60.96-centimeter (i.e., 24-inch) diagonal screen and a resolution of 0.92 megapixels corresponding to an array size of 1280 ×720 pixels. Other exemplary pixel resolutions for the display unit 40 include, without being limited to, 1600 ×900 pixels (e.g., for a 50.8-centimeter or 20-inch screen) or 1920 ×1080 pixels (e.g., for a 60.96-centimeter or 24-inch screen). Also, the display frame rate of the display unit 40 can be equal to 60 fps. It will be understood, however, that these parameters of the display unit 40 could be varied in other embodiments without departing from the scope of the invention. For example, in the embodiment of FIG. 3, the live panning system 20 is provided in a handheld device 58. In this case, the display unit 40 may have a diagonal measurement of about 12.7 -centimeters (i.e., 5 inches) and a resolution of 0.384 megapixels, corresponding to an array size of 800 ×480 pixels.

Shared Memory and Display Controller

Referring back to FIG. 4, the live panning system may optionally include a shared memory 68 and a display controller 70.

As will be understood, the shared memory 68 may be used by the video engine unit 60 to temporarily store the frames of the video stream of interest. For example, the shared memory 68 may be used to either duplicate or skip frames of the video stream of interest in embodiments where the frame rate of the video stream of interest differs from the frame rate of the display unit 40.

The display controller 70 may be used to read back the frames of the video stream of interest from the shared memory 68 and to drive the display unit 40 at the display frame rate of 60 fps, for example via a digital visual interface (DVI), a high-definition multimedia interface (HDMI) or a parallel interface. Analog RGB, Analog YUV and Display Port are other display interfaces widely used. In these embodiments, the display unit 40 receives frames representing the region of interest identified by the user from the display controller 70 and generates therefrom the magnified video stream corresponding to the live representation of the portion of the working area.

Input Interface

Referring to FIGS. 1 to 4, the live panning system 20 also include an input interface 44 in communication with the processing unit 28 to allow the user to act on the live representation 42 of the portion 38 of the working area 26.

In the illustrated embodiment the input interface 44 is shown adjacent the working area 26 on the bottom platform 56, at a position easily accessible to the user, but one of ordinary skill in the art will readily understand that the input interface 44 could be provided at a different location without departing from the scope of the invention. For example, the input interface may be provided on a remote control connected directly or wirelessly to the frame structure 52. The communication between the processing unit 28 and input interface 44 can be accomplished through a wired connection or wirelessly. In one embodiment, the input interface 44 includes a touchpad 72. The touchpad 72 may be embodied by any suitable technology and may be responsive to typical touch commands such as a pan gesture, a swipe gesture, a tap gesture and a pinch-and-zoom gesture. The input interface 44 may further or alternatively include at least one control button 74. Moreover, in other embodiments, additional control buttons may also be used to allow the user to control the live panning system 20. Further embodiments for the input interface may include a mouse, wheel, track ball or joystick or combinations of the above.

Alternatively, in the embodiment shown in FIG. 3 where the live panning system 20 is provided in a handheld device 58, the display unit 40 of the handheld device 58 may, in addition to providing an output interface for displaying the live representation 42 of the portion 38 of the working area 26, include an input interface 44 taking input from a user based on haptic and/or tactile contact. In such embodiments, the display unit 40 includes, on at least a portion thereof, a touch screen including a touch-sensitive surface.

Selection of the Cropping Window Outputted by the Image Sensor

The components of a live panning system embodying the invention having been described, the process of selecting the parameters of the cropping window outputted by the image sensor as a function of viewing instructions from the user and the properties and limits of the image sensor will now be discussed.

As will be understood by one of ordinary skill in the art, image sensors such as CMOS sensors can generally be programmed to output video streams at a particular frame rate and frame size. These two parameters may be respectively expressed in terms of a number of frames per second (fps) and a number of pixels per frame. The product of the frame size multiplied by the frame rate yields a quantity expressed in pixels per second, which corresponds to the output pixel rate of the image sensor. However, the output pixel rate of an image sensor such as a CMOS sensor cannot generally be increased beyond a certain value, referred to herein as the "maximum output pixel rate" of the image sensor. In other words, the maximum output pixel rate represents a physical limit characterizing the maximum number of pixels that can be outputted by the image sensor over a given period of time. It is known in the art that the maximum output pixel rate of common high-resolution CMOS sensors generally does not exceed 250 MHz (or, equivalently, 250 megapixels per second), although the maximum may of course evolve with available technologies.

Referring now to the embodiment of FIG. 4, the case of an image sensor 22 having a resolution of 8 megapixels arranged in an array of 3264×2448 pixels can be used as an example. In such a case, outputting the pixel data from all pixels of the array 30 at the preferred sensor frame rate of 60 fps requires an output pixel rate of 480 megapixels per second, which exceeds significantly the maximum output pixel rate of common high-resolution CMOS sensors. In order to circumvent the output pixel rate limitation of existing image sensors, embodiments of the live panning system rely on window cropping and, optionally, on pixel binning, skipping or scaling. These processes will now be considered below.

Window Cropping

Referring to FIG. 4 and as described above, the image sensor 22 according to embodiments of the invention is capable of reading out and outputting the pixel data of only a limited number of output pixels from the array 30 above a certain frame rate.

In such a case, the output pixels outputted by the image sensor 22 define a cropping window which has a smaller frame size than the image of the entire working area. For example, as shown in FIGS. 5A to 7C and 9A to 10D, the cropping window 32a has a frame size of 1.57 megapixels arranged in an array of 1632×960 pixels, so that outputting the pixel data of the output pixels of the cropping window 32a at the preferred sensor frame rate of 60 fps requires an output pixel rate of about 94 megapixels per second, which is achievable by existing high-resolution image sensors.

One of ordinary skill in the art will understand that instructing the image sensor to output a cropping window that covers a partial region of the image of the working area may be advantageous when the live representation has a relatively high magnification level such that the region of interest identified by the user is also restricted to a relatively small area of the image.

This is illustrated, for example, in FIGS. 5A to 5D, where the region of interest 36 corresponds to a relatively small area of the image 24 which is entirely circumscribed by the cropping window 32a. Moreover, as shown in FIGS. 8A to 8C, this small region of interest 36 corresponds to an equally small portion 38 of the working area 26 whose live representation 42 is displayed on the display unit 40 at a relatively high magnification level.

Full-Pixel and Reduced-Pixel Modes

Window cropping as described above can be especially useful at relatively high magnification levels (or equivalently for relatively small regions of interest within the image). In such cases, it can be said that the image sensor outputs the cropping window in an output mode referred to herein as a "full-pixel mode", wherein the image sensor outputs the pixel data of all the output pixels in the cropping window.

At lower magnification levels, however, the image sensor generally has to output the pixel data of all the pixels of the array (see, e.g., FIG. 7A to 7C) or of a substantial fraction thereof (see, e.g., FIGS. 6A to 6D) in order to provide the live representation of the portion of the working area that corresponds to the region of interest identified by the user. In such cases, operating the image sensor to output the cropping window in the full-pixel mode while preserving an acceptable frame rate may not be possible. To address this issue, the image sensor 22 such as that of FIG. 4, may be configured to output the cropping window in an output mode referred to herein as a "reduced-pixel mode". In the reduced-pixel mode the image sensor 22 outputs a reduced version of the pixel data of the output pixels in the cropping window.

In some embodiment, the reduced-pixel mode includes a binned-pixel mode wherein the image sensor outputs binned pixel data each corresponding to a combination of the pixel data of a cluster of the output pixels. As known in the art, pixel binning may be achieved, for example, by averaging the voltage levels of adjacent pixels within the array. For example, in a 2×2 binning process, the output pixels defining the cropping window outputted by the image sensor are grouped in clusters of four pixels. The pixel data of the output pixels of each cluster are then averaged to yield binned pixel data. As also known in the art, pixel binning, in addition to reducing the output resolution of the image sensor, also offers the added advantage of increasing the signal-to-noise in the image data outputted by the image sensor.

Referring to FIGS. 5A to 5D, when the image sensor 22 is operated in a 2×2 binned-pixel mode, the cropping window 32a, which has a resolution of 8 megapixels (3264×2448 pixels) can be outputted at a lower resolution of 2 binned megapixels (1632×1224 binned pixels), therefore allowing to keep a frame rate of 30 fps without exceeding the maximum output pixel rate of conventional image sensors.

It will be appreciated that while the image sensor 22 has been described as being configured to apply a 2×2 binning process, it may alternatively or additionally be configured to apply any suitable type of binning process including vertical binning, horizontal binning, and the like. By way of example, typical current sensors are equipped with a Bayer filter which creates 2×2 clusters of pixel including two green pixels, one red pixel and one blue pixel. In order to support full color mode, binning and cropping modes that can be supported are 2×2, 4×4 and 16×16 modes. In some embodiments, the image sensor 22 may be configured to switch between different binning modes during image acquisition.

Alternatively, or additionally, in further embodiments, the reduced-pixel mode may include a skipped-pixel mode wherein the image sensor outputs the pixel data of only a subset of the output pixels. In the skipped-mode, instead of averaging pixel data from clusters of pixel, the image sensor 22 is configured to only output certain pixels inside the cropping window, such as every other pixel, every three pixels, and so forth. Other possible skipping modes include two, four and sixteen skipped-pixel modes.

Alternatively or additionally, in further embodiments, the reduced-pixel mode may include a scaled-pixel mode wherein the image sensor outputs a rescaled cropping window having a different pixel resolution than the cropping window (typically a smaller pixel resolution), but representing the same portion of the image as the output pixels of the cropping window. The scaling of the output pixels to yield the rescaled cropping window can be performed using various techniques known to one of ordinary skill in the art.

Referring to FIG. 4, it will be understood that depending on the viewing instructions received from the user, one of the output modes of the image sensor 22 can be selected as a selected output mode, that is, one of the full-pixel mode and the reduced-pixel mode. Depending on the embodiment, the selection of the selected output mode may be controlled by the image sensor 22 itself (e.g., the windowing module 34), by the processing unit 28 receiving the viewing instructions, by the video engine unit, by a combination thereof or by another component of the live panning system 20. In particular, the selected output mode of the image sensor 22 can be selected based on: (i) the number of the output pixels in the cropping window; (ii) the desired sensor frame rate of the image sensor; and (iii) the maximum output pixel rate of the image sensor.

For example, in some embodiment, the selected output mode may be the full-pixel mode if the product of the number of output pixels in the cropping window multiplied by the desired sensor frame rate is equal to or less than the maximum output pixel rate of the image sensor. In contrast, the selected output mode may be the reduced-pixel mode if the product of the number of output pixels in the cropping windows multiplied the desired sensor frame rate of the image sensor is greater than the maximal out pixel rate of the image sensor.

In this regard, referring to FIGS. 4 and 11A to 11D, when using a 60.96-centimeter (i.e., 24-inch) monitor as the display unit 40, the processing unit 28 instructs the image sensor 22 to output one of the cropping windows 32a to 32c depending on the magnification level set by the user, More specifically, in order to provide the desired magnification level at an optimal sensor frame rate, the selected output mode of the image sensor and the frame size of the cropping windows 32a to 32c can be selected as indicated in TABLE 1 below. Of course, it will be understood that the parameters of TABLE 1 are given by way of example only, and that the number and parameters of the cropping windows outputted by the image sensor as a function of viewing instructions provided by a user may differ in other embodiments of the live panning system. For example, in some embodiments, the cropping window could be outputted in a full-pixel mode down to a magnification level of 1× to 3× if the sensor frame rate is reduced below 30 fps (e.g., 20 fps).

TABLE 1

Parameters of cropping windows outputted by the image sensor for different ranges of magnification level, in accordance with an embodiment

| Cropping window | Magnification level | Selected output mode | Resolution of cropping window (pixels × pixels) | Sensor frame rate (fps) |
| --- | --- | --- | --- | --- |
| 32a | 6X to 20X | Full-pixel | 1632 × 960 | 60 |
| 32b | 3X to 6X | Full-pixel | 3264 × 1920 | 30 |
| 32c | 1X to 3X | Reduced-pixel (2 × 2 binning) | 1632 × 1224 | 30 |

Examples of Live Panning Processes

Referring to FIGS. 5A to 8C, some of the live panning capabilities of an embodiment of the live panning system 20 will now be described. FIGS. 5A to 7C provide schematic representations of the image 24 of the entire working area 26 shown in FIGS. 8A to 8C and having an object 48 disposed thereon. The object 48 is a letter-sized document including images and textual content. In FIGS. 5A to 7C, the image 24 has a resolution of 8 megapixels arranged in an array of 3264×2448 pixels. FIGS. 5A to 7C also illustrate three exemplary cropping windows 32a to 32c that can be outputted by the image sensor 22. The parameters of the cropping windows 32a to 32c are given in TABLE 1.

As discussed above, the image sensor 22 outputs one of the three cropping windows 32a to 32c based on viewing instructions from a user identifying a region of interest 36 within the image. More specifically, the selection of the appropriate cropping window 32a to 32c is made such that the region of interest 36 is always encompassed within the selected cropping window 32a to 32c. It will be understood that when the region of interest 36 is displayed on a display unit 40 at a given magnification level, a high magnification level on the display unit 40 generally corresponds to a small region of interest 36 within the image 24, and vice versa. In FIGS. 8A to 8C, the display unit 40 has a 60.96-centimeter (i.e; 24-inch) diagonal screen and a resolution of 0.92 megapixels corresponding to an array size of 1280×720 pixels. Moreover, the portion 38 of the working area 26 whose live representation 42 is presented on the display unit 40 is indicated by a dashed rectangle on the document disposed on the working area 26.

In the examples below, it will be seen that once the cropping window 32a to 32c outputted by the image sensor 22 is selected on account of a given region of interest 36 identified by the user, live panning is performed either by the windowing module 34 of the image sensor or by the cropping module 62 of the video engine unit 60, in a manner such that the region of interest 36 is always encompassed by the selected cropping window 32a to 32c.

Example 1

Referring to FIG. 5A, the region of interest 36 within the image 24 that the user wishes to view corresponds to the portion 38 of the working area 26 whose live representation is displayed on the display unit 40 at a magnification level of 15×, as shown in FIG. 8A. In this example, at a magnification level of 15×, the image sensor 22 shown in FIG. 4 outputs the cropping window 32a (see TABLE 1), which encompasses and is centered on the region of interest 36 identified by the user. More specifically, the cropping window 32a has a resolution of 1632×960 pixels and is outputted in the full-pixel mode at 60 fps.

In FIG. 5B, the region of interest 36 is panned toward the top portion of the image 24, but remains within the cropping window 32a. Consequently, it is not necessary to move the cropping window 32a. In other words, it is not necessary to change the output pixels read out and outputted by the image sensor. Therefore, upon receiving the panning instructions from the user, the processing unit 28 in FIG. 4 communicates these instructions to the cropping module 62 of the video engine unit 60, and the cropping module 62 moves, in real-time, the region of interest 36 within the cropping window 32a. More specifically, based on viewing instructions from the user, the processing unit 28 in FIG. 4 communicates to the cropping module 62 which of the output pixels of the cropping window 32a are to be outputted as the pixels of interest. In FIG. 8B, the live representation 42 provided on the display unit 40 corresponds to the region of interest 36 identified in FIG. 5B.

Figure 5D:
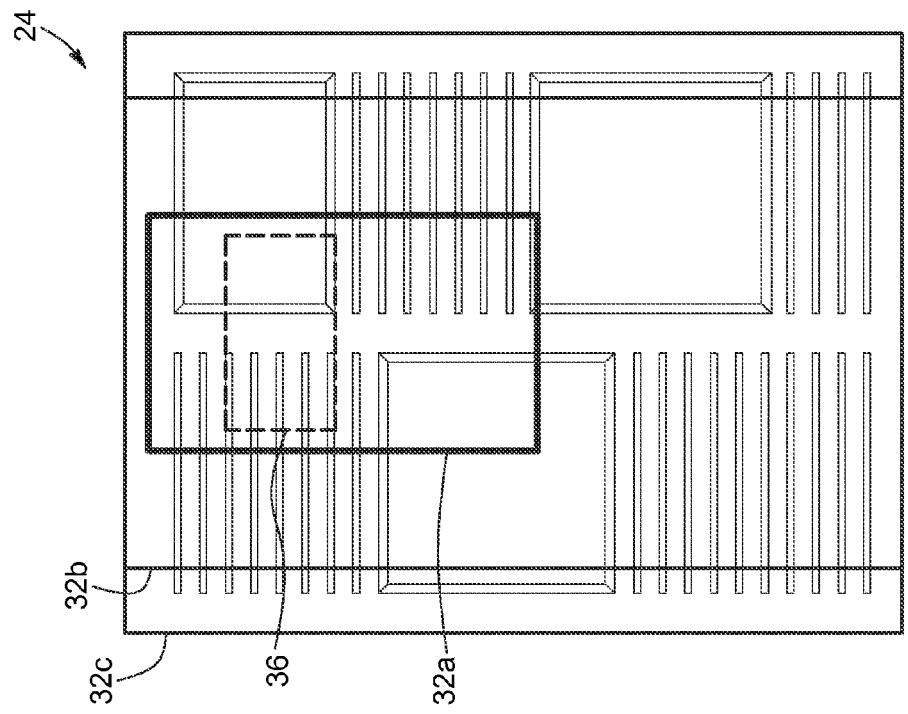
Figure 5C:
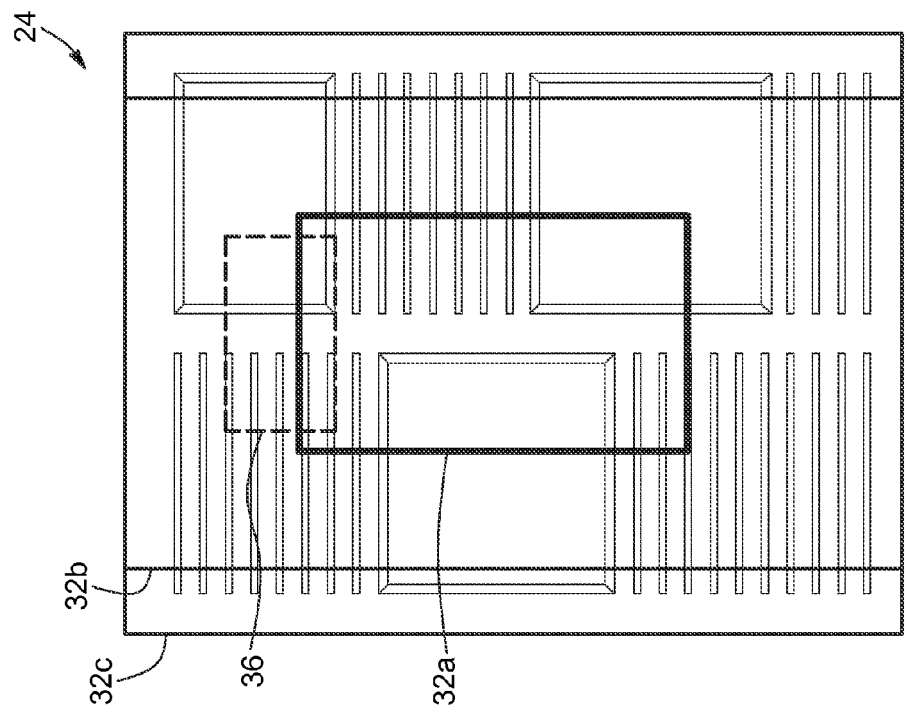

In FIG. 5C, the user continues to pan the region of interest 36 toward the top portion of the image 24, up to a position where the region of interest 36 lies partially outside the cropping window 32a. In response, the windowing module 34 of the image sensor 22 of FIG. 4 moves the cropping window 32a within the image 24 until the region of interest 36 is again encompassed within the cropping window 32a, as shown in FIG. 5D. More specifically, in FIG. 4, the processing unit 28 communicates to the windowing module 34 of the image sensor 22 which of the pixels of the array 30 are to be outputted as the output pixels and be sent to the video engine unit 60 for further cropping by the cropping module 62. Preferably, the cropping window 32a is moved such that its center coincides, if possible, with the center of the region of interest 36. In FIG. 8C, the live representation 42 provided on the display unit 40 corresponds to the region of interest 36 in FIG. 5D.

From this example, it will be understood that the live panning performed by the live panning system according to embodiments of the invention is accomplished without physically displacing the field of view 46 of the image sensor 22 with respect to the working area 26, as may be seen from FIGS. 8A to 8C. In particular, panning operations made possible by embodiments of the live panning system involve moving, in real-time, the region of interest 36 within the image 24 of the entire working area 26 such the live representation 42 of the portion 38 of working area 26 is provided to the user with negligible or insignificant time lag or delay.

It will also be understood that in embodiments of the invention, the cropping window is preferably moved by the windowing module of the image sensor only when the region of interest moves outside the boundaries of the currently outputted cropping window. In other words, when the region of interest is panned within the boundaries of the cropping window, the panning operations are preferably performed by the cropping module of the video engine unit. In this case, the output pixels outputted by the image sensor remains the same and only the pixels of interest outputted by the video engine unit are modified in response to panning instructions by the user.

In this regard, it will be appreciated that relying mainly on the cropping module of the video engine unit for panning operations rather than on the windowing module of the image sensor may be advantageous because the time required by conventional image sensors to move the cropping window within the image can be significantly longer than the time required by conventional video engine units to move the region of interest within the cropping window outputted by the image sensor. In other words, it can be advantageous, in some embodiments, that the position of cropping window be held constant unless the panning of the region of interest extends beyond the boundaries of the cropping window, as in FIG. 5C.

Example 2

Figure 6A:
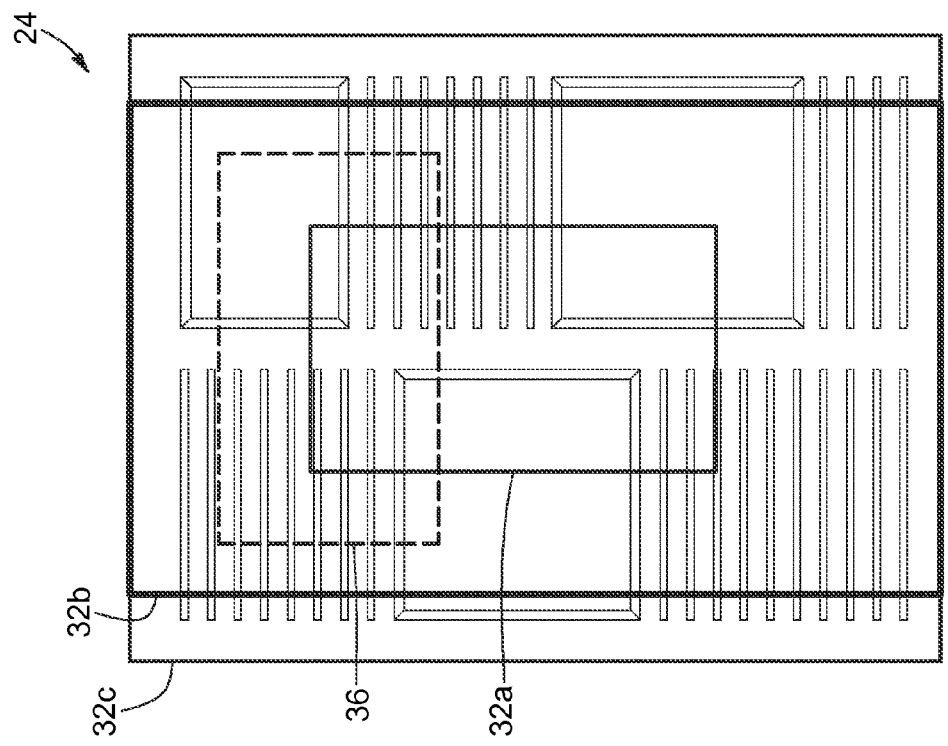
FIGS. 6A to 6D illustrate schematically another example of the live panning of a region of interest across an image of a working area, in accordance with an embodiment of the live panning system.

Referring now to FIG. 6A, the image sensor outputs the cropping window 32b. The parameters of the cropping window 32b are given in TABLE 1. More specifically, the cropping window 32b has a resolution of 3264×1920 pixels and is outputted in the full-pixel mode at 30 fps.

Figure 6B:
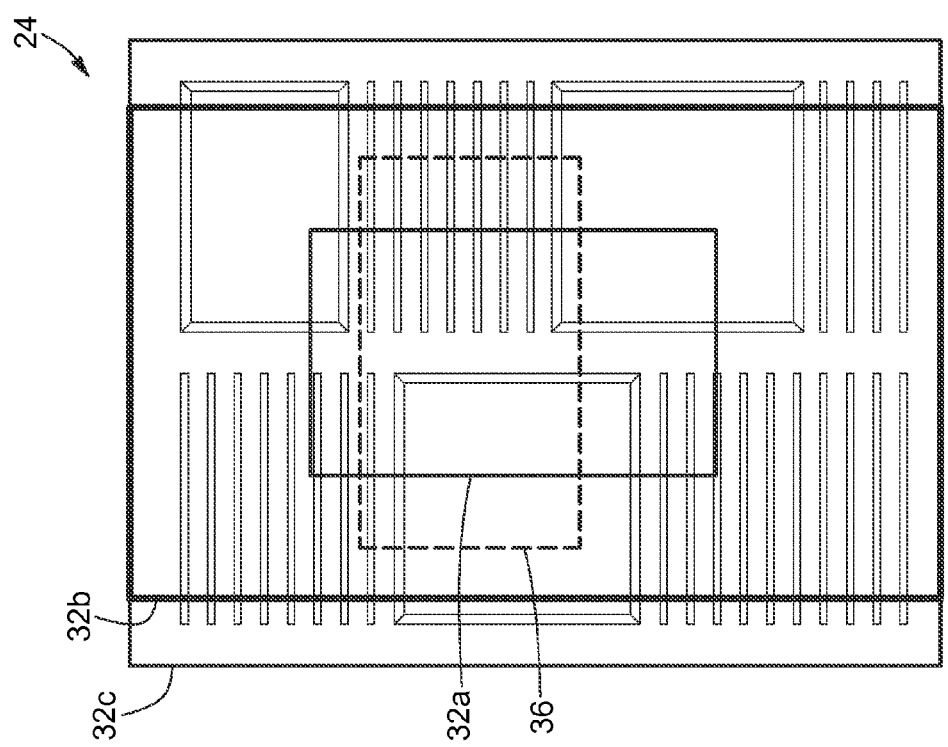

The region of interest 36 that the user wishes to view is encompassed by the cropping window 32b. In FIG. 6B, the region of interest 36 is panned toward the top portion of the image 24, but remains within the cropping window 32b such that it is not necessary to move the cropping window 32b. Hence, upon receiving the panning instructions from the user, the cropping module 62 of the video engine unit 60 moves, in real-time, the region of interest 36 within the cropping window 32b. More specifically, based on viewing instructions from the user, the processing unit 28 in FIG. 4 communicates to the cropping module 62 which of the output pixels of the cropping window 32b are to be outputted as the pixels of interest.

Figure 6D:
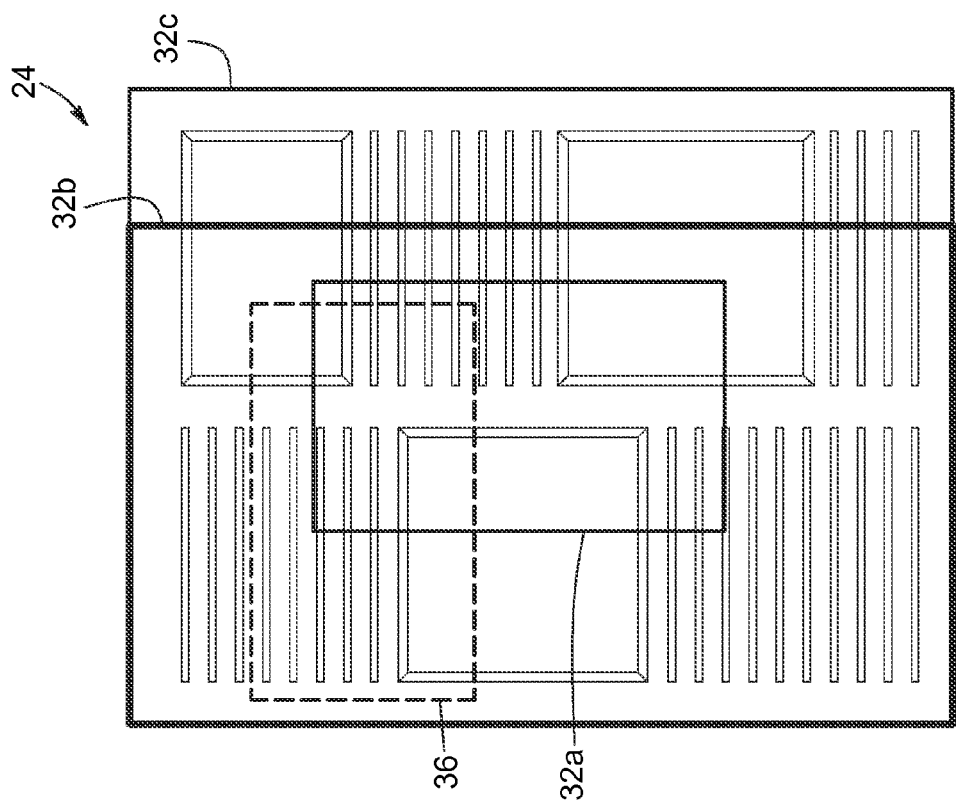
Figure 6C:
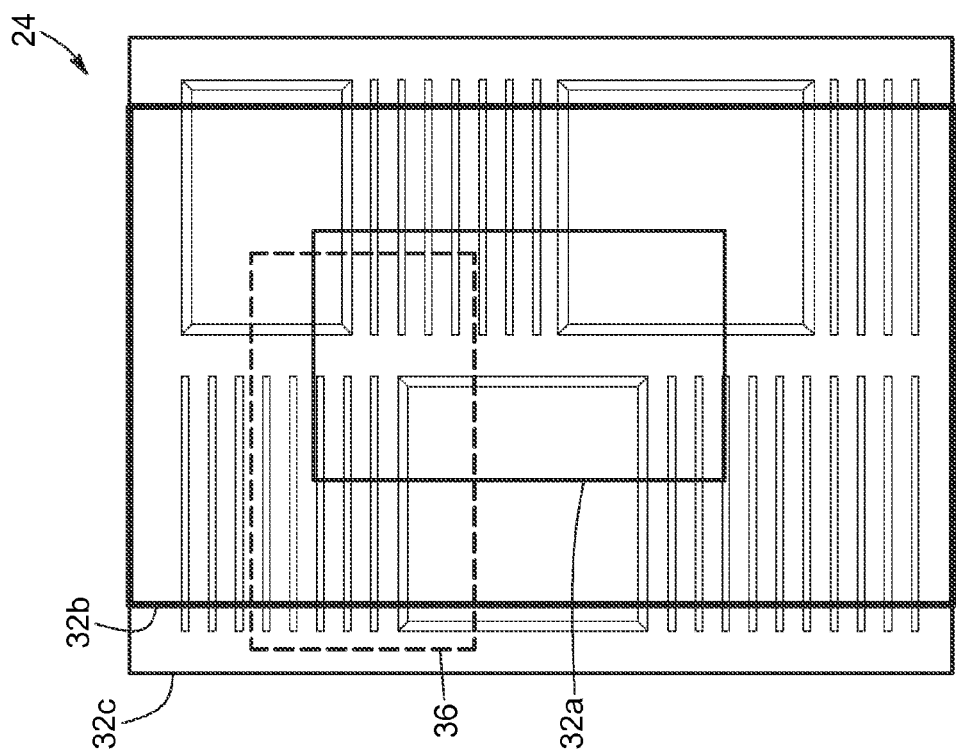

In FIG. 6C, the user pan the region of interest 36 toward the left margin of the image 24, to a position where the region of interest 36 lies partially outside the cropping window 32b. As result, the windowing module 34 of the image sensor 22 in FIG. 4 moves the cropping window 32b within the image 24 until the region of interest 36 is again encompassed within the cropping window 32b, as shown in FIG. 6D.

Example 3

Referring now to FIG. 7A, the image sensor outputs the cropping window 32c whose parameter are given in TABLE 1. More specifically, the cropping window 32c has a resolution of 1632×1224 pixels and is outputted in the reduced-pixel mode (i.e., in a 2×2 binning mode) at 30 fps. It is to be noted that, in this case, the size of the cropping window 32c coincides with that of the entire image 24 of the working area. It will be understood that when the region of interest 36 covers the entire image 24 or a substantial fraction thereof, the cropping window 32c is generally outputted at low magnification levels, as shown, for example, in FIGS. 1 and 2. The region of interest 36 that the user wishes to view is encompassed by the cropping window 32c.

Figure 7C:
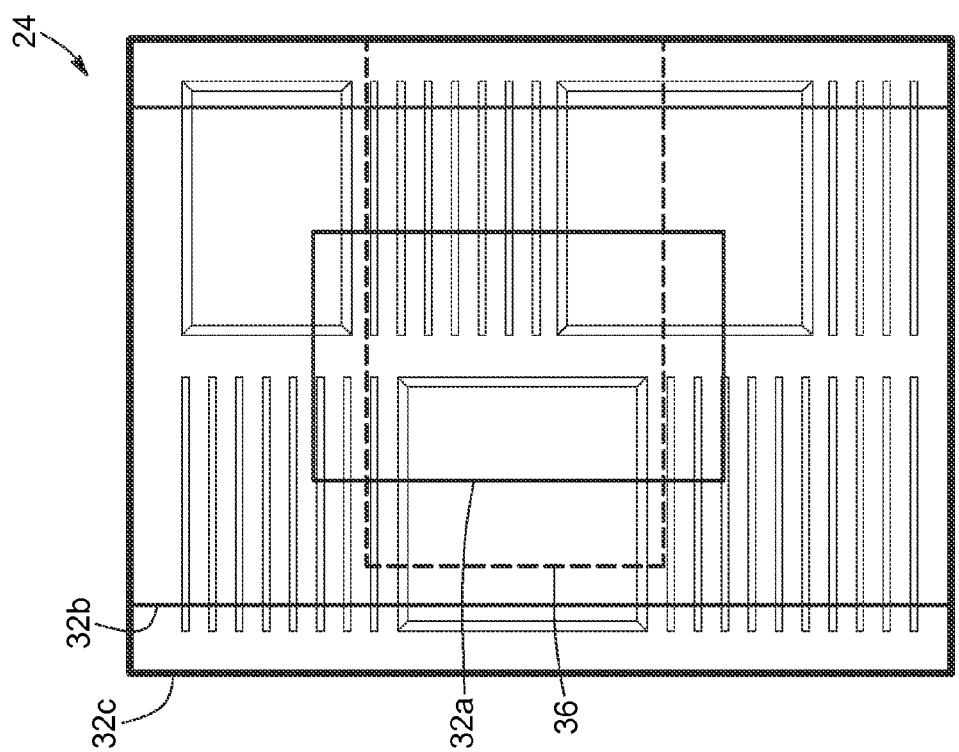

In FIG. 7B, the region of interest 36 is panned toward the right margin of the image 24, but remains within the cropping window 32c such that it is not necessary to move the cropping window 32c. In response to the panning of the region of interest 36, the cropping module 62 of the video engine unit 60 of FIG. 4 moves, in real-time, the region of interest 36 within the cropping window 32c by selecting which of the output pixels of the cropping window 32c are to be outputted as the pixels of interest. Finally, in FIG. 7C, the user pans the region of interest 36 until the region of interest 36 reaches the right boundary of the image 24.

Examples of Live Zooming Processes

Referring now to FIGS. 9A to 11D, some of the live zooming capabilities of an embodiment of the live panning system 20 will be described. FIGS. 9A to 10D provide schematic representations of the image 24 of the entire working area 26 shown in FIGS. 11A to 11D and having an object 48 disposed thereon. The object 48 is a letter-sized document including images and textual content. As in FIGS. 5A to 7C discussed above, the image 24 in FIGS. 9A to 10D has a resolution of 8 megapixels arranged in an array of 3264×2448 pixels. Likewise, the parameters of the cropping windows 32a to 32c exemplified in FIGS. 9A to 10D are given in TABLE 1.

As for the live panning processes discussed above, in zooming processes the image sensor 22 outputs of FIG. 4 one of the three cropping windows 32a to 32c based on viewing instructions from a user identifying a region of interest 36 within the image. More specifically; the selection of the appropriate cropping window 32a to 32c is made such that the region of interest 36 is always encompassed within the selected cropping window 32a to 32c. Among all cropping windows available, the smallest cropping window encompassing the region of interest 36 is preferably used because it generally permits better resolution and better frame rate. As in FIGS. 8A to 8C, the exemplary display unit 40 in FIGS. 11A to 11D has a 60.96-centimeter (i.e., 24-inch) diagonal screen and a resolution of 0.92 megapixels corresponding to an array size of 1280 ×720 pixels.

Moreover, the portion 38 of the working area 26 whose live representation 42 is presented on the display unit 40 is indicated by a dashed rectangle on the document disposed on the working area 26.

In the examples below, it will be seen that once the cropping window 32a to 32c outputted by the image sensor 22 is selected on account of a given region of interest 36 identified by the user, live zooming is performed, for the live panning system 20 shown in FIG. 4 either by the windowing module 34 of the image sensor 22 or the cropping module 62 of the video engine unit 60, in a manner such that the region of interest 36 is always encompassed by the selected cropping window 32a to 32c Example 1

Figure 11A:
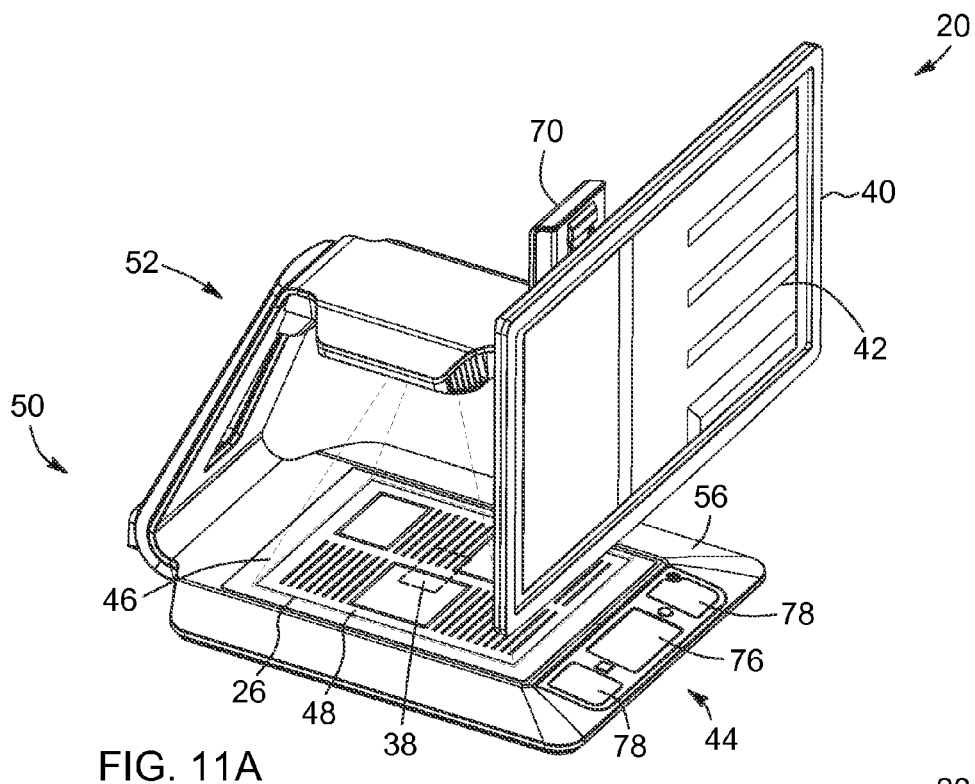
FIGS. 11A to 11D are schematic perspective side views of a live panning system for providing a live representation of a portion of a working area, in accordance with an embodiment, wherein the live representations provided in FIGS. 11A to 11D correspond to the regions of interest identified in FIGS. 9A to 9D, respectively.

Referring to FIG. 9A, the region of interest 36 within the image 24 that the user wishes to view corresponds to the portion 38 of the working area 26 whose live representation is displayed on the display unit 40 at a magnification level of 15×, as shown in FIG. 11A. In this example, at a magnification level of 15×, the image sensor 22 shown in FIG. 4 outputs the cropping window 32a (see TABLE 1), which encompasses and is centered on the region of interest 36 identified by the user.

Figure 11B:
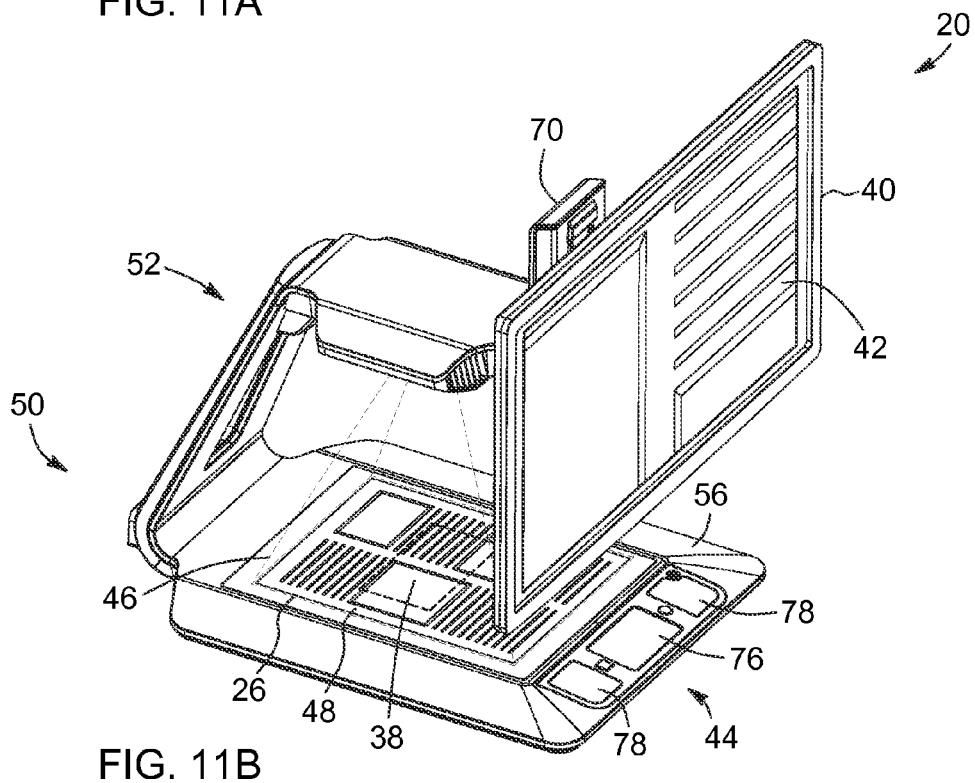

In FIG. 9B, the user has zoomed out to view a larger portion 38 of the working area 26. The size of the region of interest 36 is increased accordingly, to a point where it does not fit inside the cropping window 32a anymore. Therefore, upon receiving the zooming instructions from the user, the processing unit 28 in FIG. 4 communicates these instructions to the windowing module 34, which in turn outputs, in real-time, the cropping window 32b in replacement of the cropping window 32a. Preferably, the cropping window 32b is outputted such that its center coincides, if possible with the center of the region of interest 36. More specifically, the processing unit 28 communicates to the windowing module 34 which of the pixels of the array 30 are to be outputted as output pixels. In FIG. 11B, the live representation 42 provided on the display unit 40 corresponds to the region of interest 36 identified in FIG. 9B. It may be seen that the magnification level is lower than in FIG. 11A.

Figure 9C:
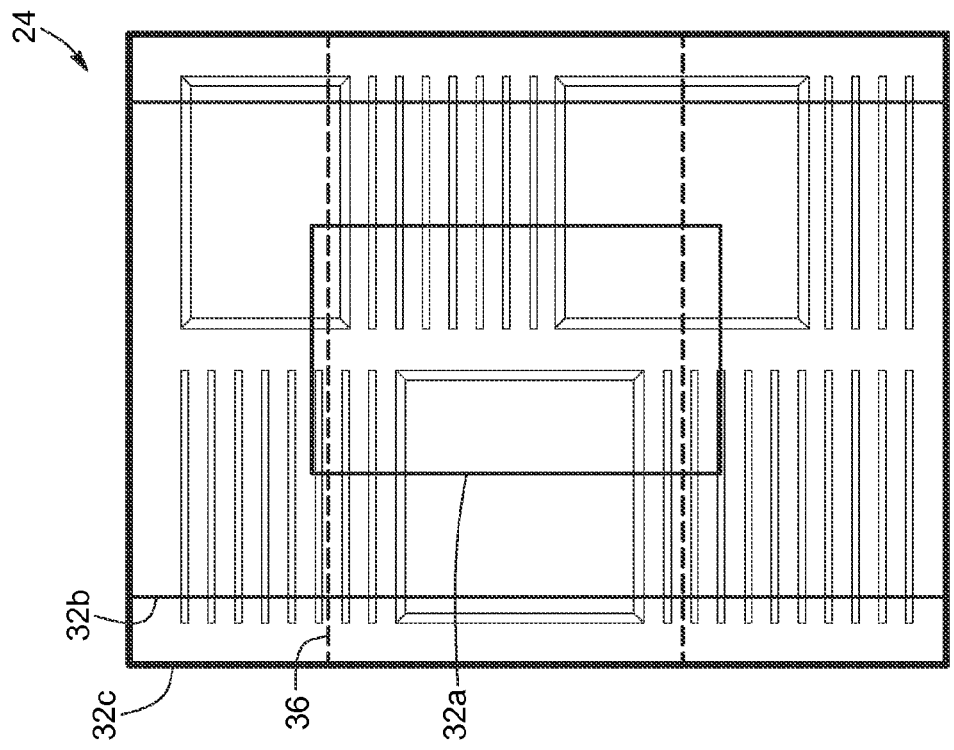
Figure 11C:
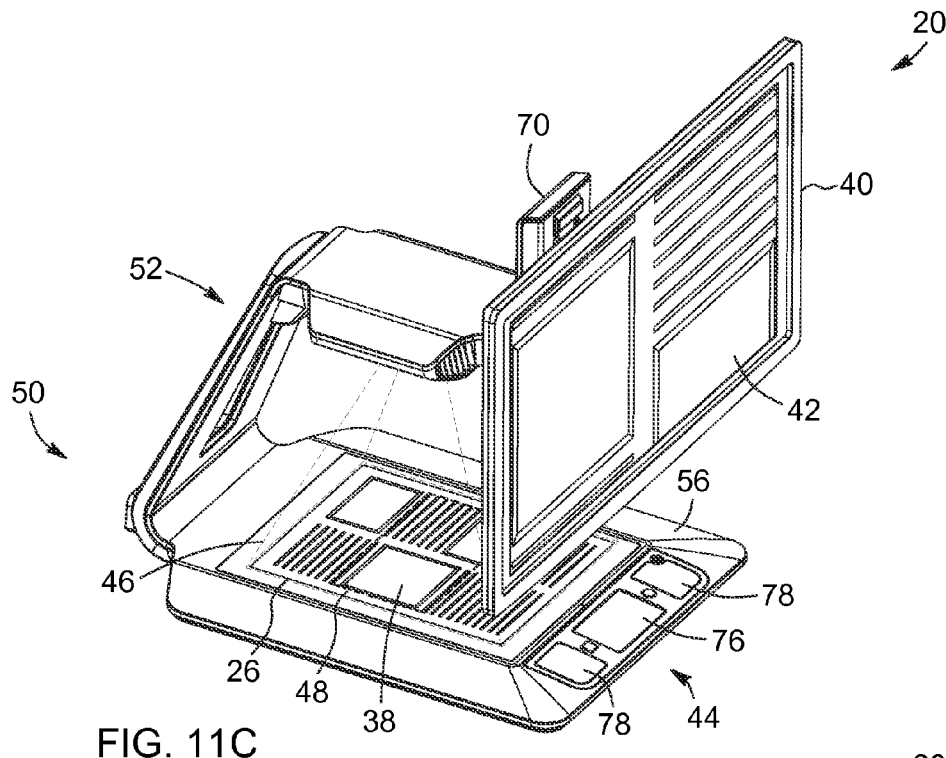

In FIG. 9C, the user continues to zoom out and the size of the region of interest 36 increases accordingly, now to a point where it cannot be fitted inside the cropping window 32b. Therefore, upon receiving the zooming instructions from the user, the windowing module 34 of the image sensor 22 in FIG. 4 outputs the cropping window 32c, as shown in FIG. 9C. Again, the cropping window 32c is preferably outputted such that its center coincides, if possible, with the center of the region of interest 36. In FIG. 11C, the live representation 42 provided on the display unit 40 corresponds to the region of interest 36 identified in FIG. 9C.

Figure 9D:
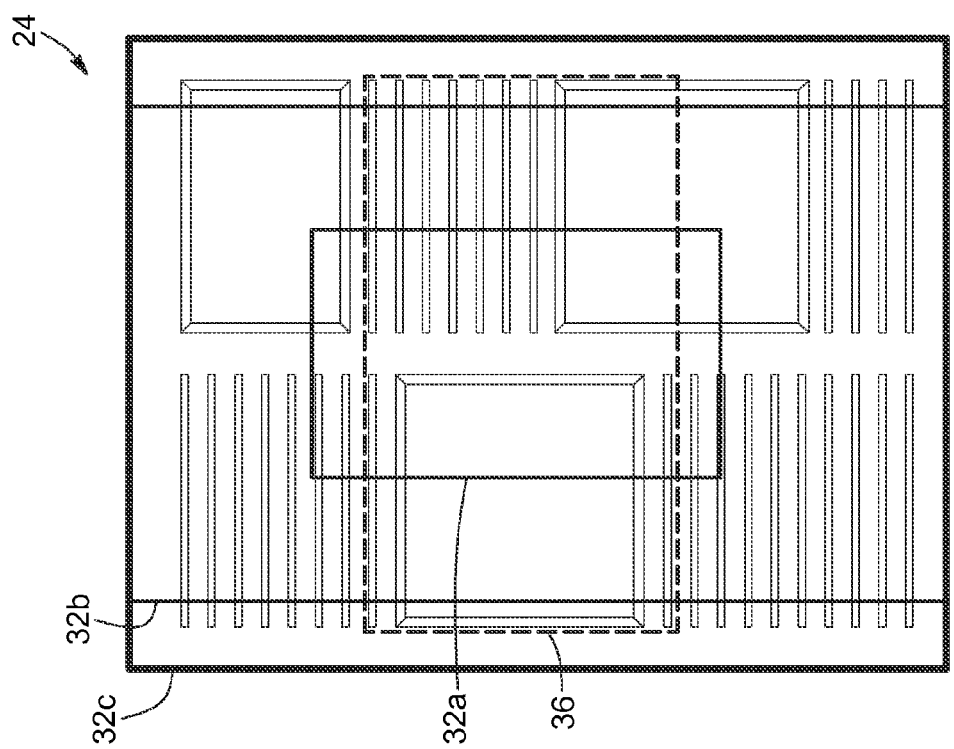
Figure 11D:
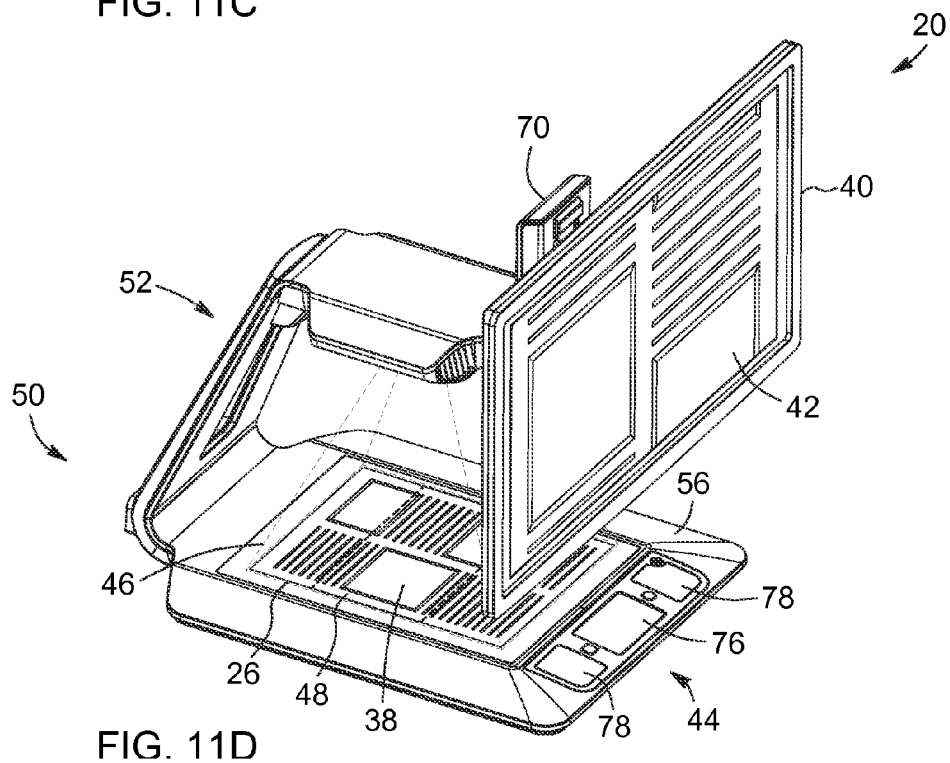

Finally, in FIG. 9D, the user has zoomed out to a point where the width of the region of interest 36 reaches the width of the cropping window 32c and, thus, the width of the image 24. The live representation 42 corresponding to the region of interest 36 of FIG. 9C is shown in FIG. 11D.

Example 2

Figure 10B:
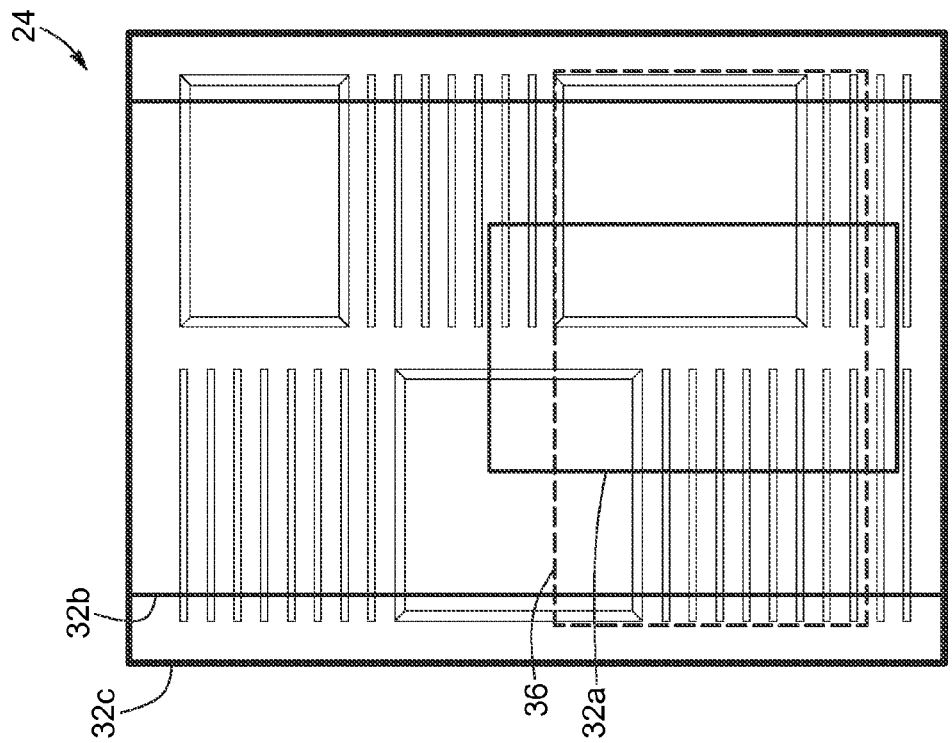
FIGS. 10A to 10D illustrate schematically an example of enlarging the size of a region of interest of an image of a working area in response of zooming instructions from a user, in accordance with an embodiment of the live panning system.
Figure 10A:
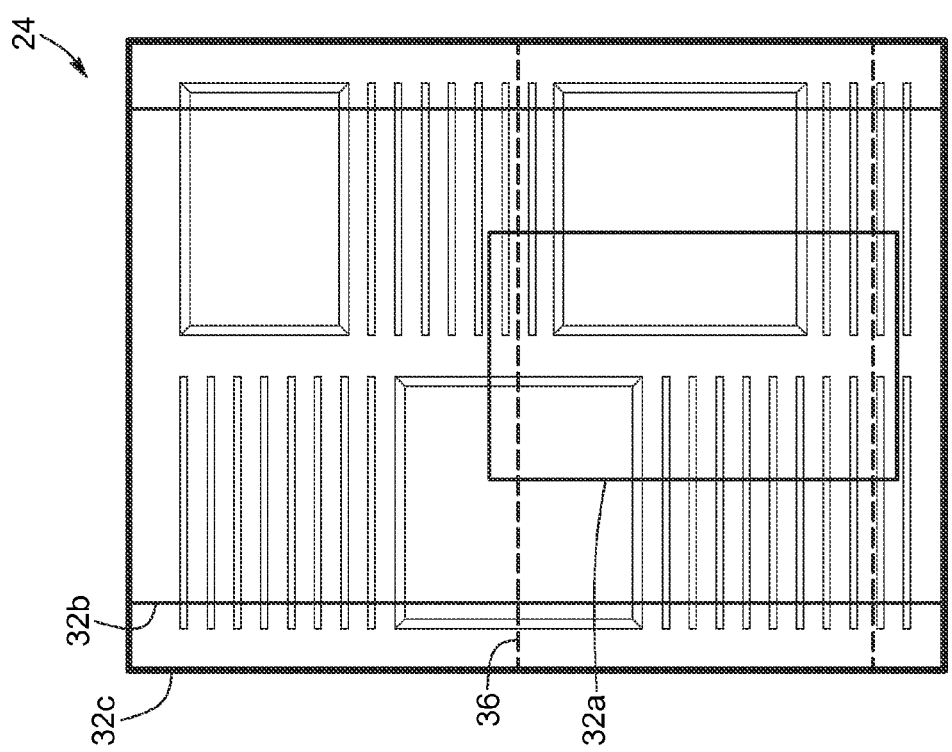
Figure 10D:
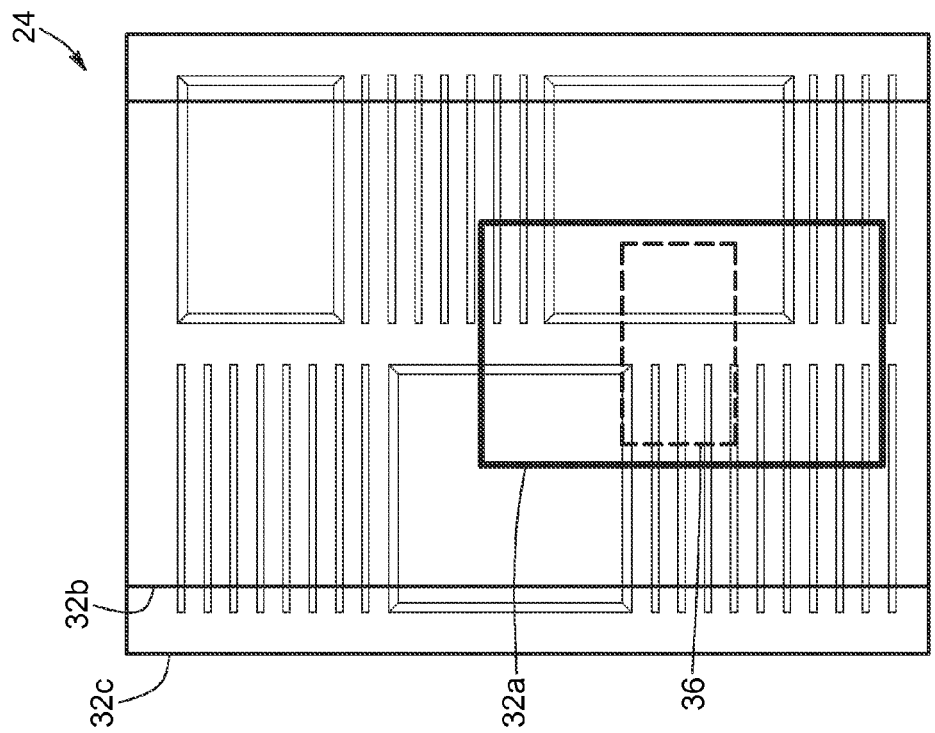

Referring now to FIG. 10A, the width of the region of interest 36 selected by the user corresponds to the width of the image 24 of the working area, such that the image sensor 22 in FIG. 4 outputs the cropping window 32c. In FIG. 10B, the user has zoomed in onto the image 24. The size of the region of interest 36 decreases accordingly, but not to a point where it could fit inside the cropping window 32b. As a result, the image sensor 22 continues to output the cropping window 32c and the cropping module 62 of the video engine unit 60 to outputs, from the output pixels received from the image sensor 22, the pixels of interest corresponding to the now smaller region of interest 36. The scaling module 64 of the video engine unit 60 can also be configured accordingly.

Figure 10C:
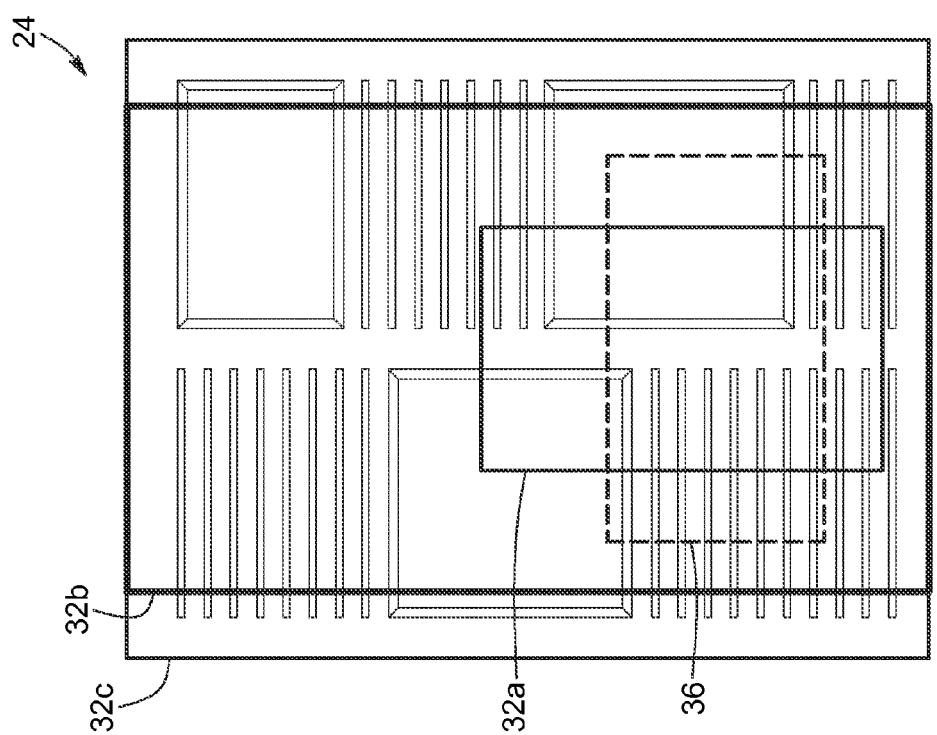

Referring now to FIG. 10C, the user continues to zoom in onto the image 24 to a point where the region of interest 36 could fit inside the cropping window 32b. As a result, the windowing module 34 of the image sensor 22 in FIG. 4 outputs the output pixels corresponding to the cropping window 32b, preferably centered on the region of interest 36. Finally, in FIG. 10D, the user has zoomed in to a point where the region of interest 36 fits inside the cropping window 32a. Accordingly, the windowing module 34 of the image sensor 22 outputs the output pixels corresponding to the cropping window 32a, preferably centered on the region of interest 36.

Figure 12:
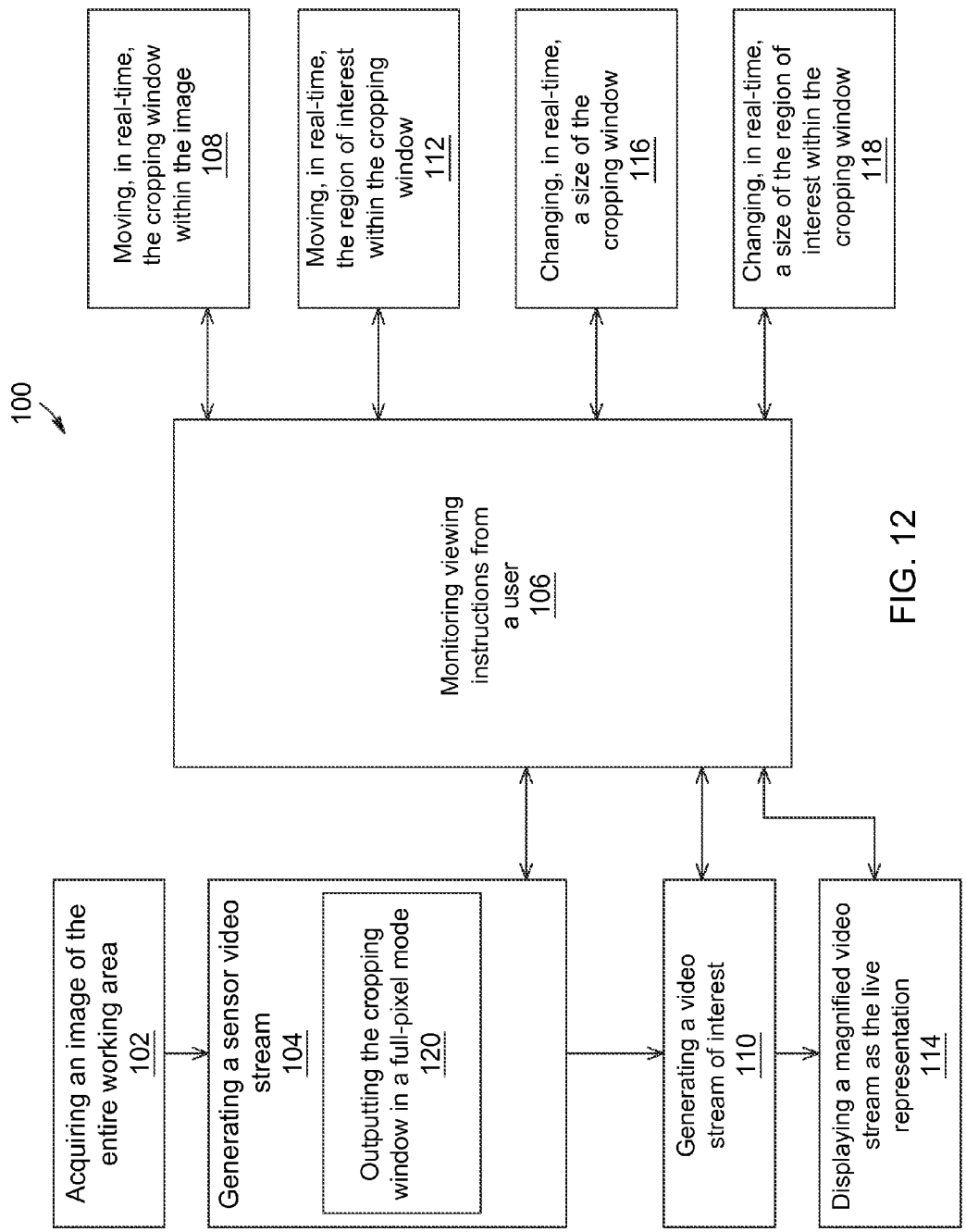
FIG. 12 is a flow chart of a live panning method for providing a live representation of a portion of a working area, in accordance with an embodiment.

Live Panning Method for Providing a Live Representation of a Portion of a Working Area In accordance with another aspect of the invention, there is provided a live panning method for providing a live representation of a portion of a working area. FIG. 12 shows a flow chart of an embodiment of the live panning method 100, which could, by way of example, be performed with a live panning system such as those illustrated in FIGS. 1 to 3.

As will be discussed in greater detail below, live panning methods according to embodiments of the invention may be particularly useful when performed with video magnifiers directed to individuals suffering from low vision or other visual impairments. As mentioned above, common video magnifiers for low-vision individuals generally involve displacing the working area to bring different portions of the working area within the field of view of the image sensor. For at least this reason, panning in conventional video magnifiers may be cumbersome or inefficient, leading to degradation in performance and usability. To help address this situation, the live panning method according to embodiments of the invention can achieve panning without the user having to physically or mechanically move the image sensor and the working area relative to each other. However, it is to be noted that while some embodiments of the live panning method may be targeted to low-vision individuals, one of ordinary skill in the art will understand that the live panning method could, in general, be used by any person desiring a device capable of panning across an image of a working area in real-time and without having to move the field of view of an image sensor with respect to the working area.

Referring to FIG. 12, the live panning method 100 first includes a step 102 of acquiring an image of the entire working area. As mentioned above, the working area is preferably sufficiently large to allow the image of the entire surface of a document having a standard letter size to be acquired at a distance of less than about 25 cm. As known in the art, standard paper sizes include, without being limited to, Letter (215.9 mm×279.4 mm), A3 (297 mm×420 mm), A4 (210 mm×297 mm), A5 (148 mm×210 mm), and the like. Of course, these values and ranges are provided for illustrative purposes only and that embodiments of the live panning method may operate outside these ranges. Also preferably, the step 102 of acquiring the image of the entire working area includes acquiring the image at a high-resolution such as, for example, at least 5 megapixels, although lower resolution images could be acquired without departing from the scope of the present invention.

The live panning method 100 also includes a step 104 of generating a sensor video stream by reading out, at a sensor frame rate, a cropping window within the image. The cropping window thus represents one frame of the sensor video stream. As mentioned above, the sensor frame rate is preferably equal to 30 or, further preferably, to 60 fps in order for the live panning method 100 to provide a live representation of the portion of the working area that remains fluid from the perspective of the human eye. Of course, any other appropriate values may be used for the sensor frame rate without departing from the scope of the present invention.

It will be understood that depending, inter alia, on performance requirements or particularities of the live panning method 100, the cropping window may assume a plurality of size or shape, as discussed above in connection with FIGS. 5A to 7C and 9A to 10D. In particular, as exemplified in FIGS. 5A to 7C and 9A to 10D, the cropping window 32a to 32c may correspond to the entire image 24 of the working area (e.g., cropping window 32c) or to a partial region thereof (e.g., cropping windows 32a and 32b). However, the step 104 of generating the sensor video stream is not limited to a particular size or shape of cropping windows.

Referring back to FIG. 12, the live panning method 100 further includes a step 106 of monitoring viewing instructions from a user identifying a region of interest within the image corresponding to the portion of the working area. As mentioned above, the region of interest refers to a region of the image of the working area (e.g., an area in pixels×pixels of the image) that contains information of interest to a user. The region of interest may correspond to a fraction of or to the entire image of the working area.

Still referring to FIG. 12, the live panning method 100 also includes, on account of the step 106 of monitoring the viewing instructions from the user, a step 108 of moving, in real-time, the cropping window within the image such that the cropping window always encompasses the region of interest. For example, when the user requests to view a region of interest of the image that is located, at least partially, outside of the cropping window currently outputted by as the sensor video stream, the step 108 of moving, in real-time, the cropping window within the image involves digitally panning the cropping window so that it encompasses the new region of interest selected by the user The live panning method 100 exemplified in FIG. 12 can include a step 110 of generating a video stream of interest by reading out the region of interest identified by the user within the cropping window at a frame rate preferably equal to the frame rate of the sensor video stream which, as mentioned above, may, but need not, be equal to 30 or 60 fps. It will be understood that the region of interest of the image represents one frame of the video stream of interest. In such embodiments, the live panning method 100 may further include a step of moving 112, in real-time, the region of interest within the cropping window on account of the viewing instructions from the user.

The live panning method 100 of FIG. 12 also includes an optional step 114 of displaying, in real-time and at a display frame rate, a magnified video stream of the region of interest identified by the user. As mentioned above, the magnified video stream is based on the sensor video stream and, in some embodiments, on the video stream of interest. In particular, the magnified video stream corresponds to the live representation of the portion of the working area. Also preferably, the display frame rate can be equal to 60 fps.

In view of the discussion related to the exemplary live panning processes illustrated in FIGS. 5A to 8C, it will be understood that the steps 108 and 112 of respectively moving, in real-time, the cropping window within the image and the region of interest within the cropping window together allow the live panning of the region of interest within the image. In particular, referring back to FIG. 12, the step of 108 moving the cropping window within the image is preferably performed only when the region of interest moves outside the boundaries of the currently outputted cropping window. In other words, when the region of interest is panned by the user within the boundaries of the cropping window currently outputted in the step 104 of generating the sensor video stream, the panning operations are preferably carried out by performing the step 112 of moving the region of interest within the cropping window.

Still referring to FIG. 12, the live panning method 100 can also allow performing live zooming operations by enlarging or reducing the size of the region of interest in response to zooming instructions from the user. For this purpose, the live panning method 100 may include a step 116 of changing, in real-time, a size of the cropping window on account of viewing instructions from the user selecting a size of the region of interest such that the cropping window always encompasses the region of interest. The live panning method 100 may also include a step 118 of changing, in real-time, a size of the region of interest within the cropping window on account of the viewing instructions from the user. As mentioned above in view of the discussion related to the zooming processes depicted in FIGS. 9A to 11D, it will be understood that the steps 116 and 118 of respectively changing, in real-time, the size of the cropping window within the image and the size of the region of interest within the cropping window together allow the live zooming onto or out of the region of interest in response to zooming instructions from the user.

As will be understood, the step 104 of generating the sensor video stream generally involves selecting the sensor frame rate and the frame size of the cropping window forming the sensor video stream. These two parameters may be respectively expressed in terms of a number of frames per second and a number of pixels per frame, and their product yields a quantity expressed in pixels per second, which corresponds to an output pixel rate. Preferably, the frame size of the cropping window and the sensor frame rate of the sensor video stream are jointly selected so that the output pixel rate does not exceed a maximum output pixel rate imposed characterizing a given embodiment of the live panning method. For example, the maximum output pixel rate may represent a physical limit characterizing the maximum number of pixels that can be outputted by a system performing the live panning method. In order to circumvent physical limitations related to the maximum output pixel rate, the embodiment of the live panning method 100 illustrated in FIG. 12 relies on window cropping, as discussed above, and optionally, on pixel binning or skipping.

Figure 13:
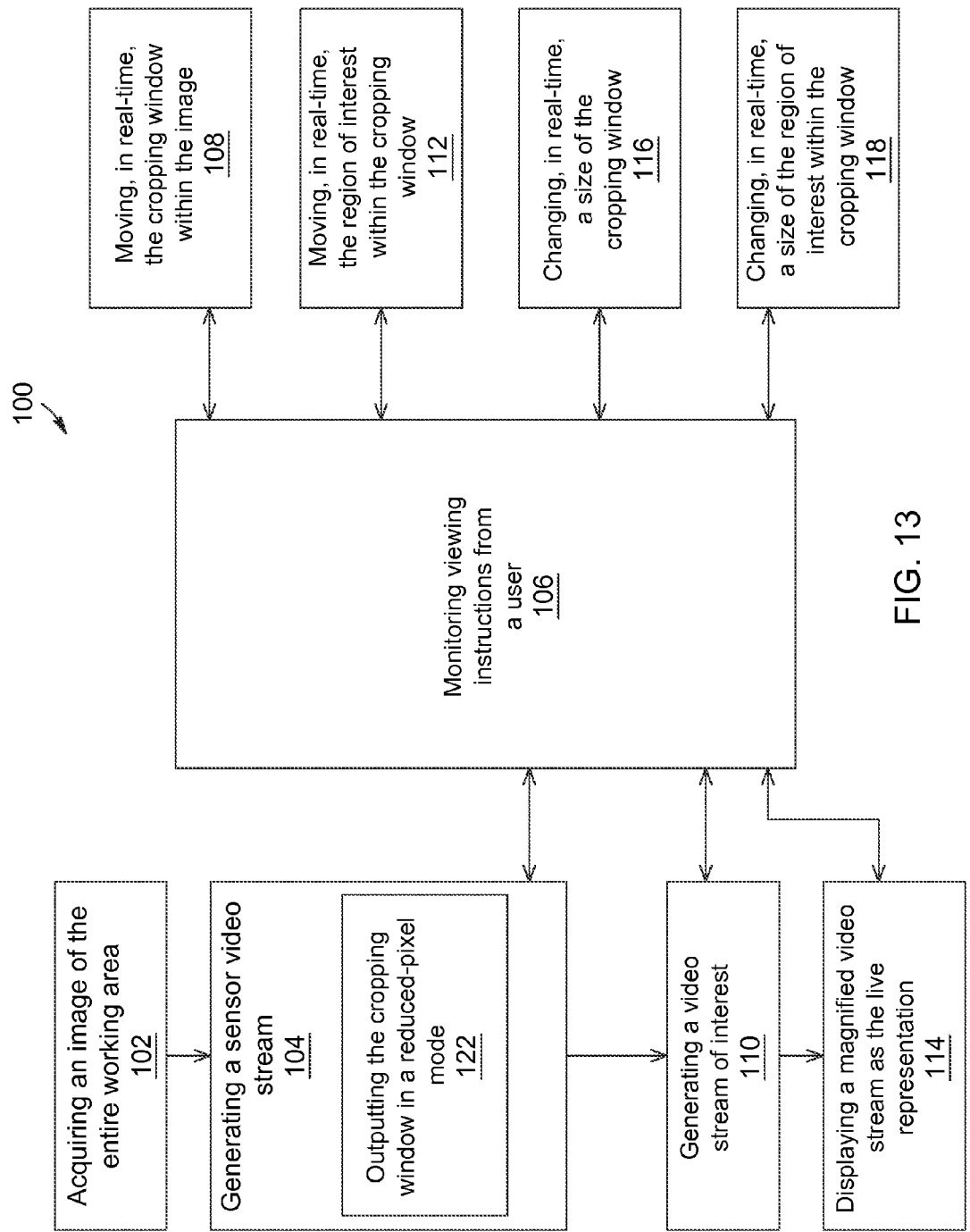
FIG. 13 is a flow chart of a live panning method for providing a live representation of a portion of a working area, in accordance with another embodiment.

In regard to pixel binning and skipping, in the embodiment shown in FIG. 12, the cropping window read out in the step 104 of generating the sensor video stream includes a number of output pixels, each having pixel data associated therewith. Moreover, the step 104 of generating the sensor video stream further includes outputting the cropping window in any one of a plurality of output modes. More specifically, generating 104 the sensor video stream may include outputting the cropping window in a full-pixel mode 120 wherein the pixel data of all the output pixels in the cropping window are outputted or, referring to the alternative embodiment of FIG. 13, outputting the cropping window in a reduced-pixel mode 122 wherein a reduced version of the pixel data of the output pixels in the cropping window are outputted.

The full-pixel mode and the reduced-pixel mode have been described above in connection with the description of embodiments of the live panning system. In particular, selecting between the full-pixel mode and the reduced-pixel mode may be based on criteria such as (i) a required size of the cropping window; (ii) a desired sensor frame rate of the sensor video stream; and (iii) a maximum output pixel rate associated with a particular embodiment of the live panning method.

In this regard, it will be understood that the full-pixel mode may be useful at high magnification levels, where the region of interest corresponds to a relatively small fraction of the image of the working area. On the other hand, the reduced-pixel mode may be useful at low magnification levels, where the region of interest corresponds to a relatively large fraction of the image of the working area. Furthermore, the reduced-pixel mode may include, for example, a binned-pixel mode wherein outputting 122 the cropping window includes outputting binned pixel data each corresponding to a combination of the pixel data of a cluster of the output pixels, or a skipped-pixel mode wherein outputting 122 the cropping window includes outputting the pixel data of only a subset of the output pixels. Some advanced CMOS sensor could also provide scaling capabilities in addition to pixel binning and pixel skipping.

Of course, numerous modifications could be made to the embodiments described above without departing from the scope of the present invention.

The invention claimed is:

1. A live panning system for providing a live representation of a portion of a working area, the live panning system comprising:
    an image sensor configured to acquire an image of the entire working area, the image sensor comprising:
        an array of pixels each providing pixel data of the image, the image sensor being configured to read out the pixel data of a number of output pixels from the array of pixels at a sensor frame rate to generate a sensor video stream, the output pixels corresponding to a cropping window within the image; and
        a windowing module configured to move, in real-time, the cropping window within the image,
    wherein the image sensor outputs the cropping window in any one of a plurality of output modes comprising:
        a full pixel mode wherein the image sensor outputs the pixel data of all the output pixels in the cropping window; and
        a reduced-pixel mode wherein the image sensor outputs a reduced version of the pixel data of the output pixels in the cropping window,
    wherein the image sensor outputs a selected one of said plurality of output modes based on:
        the number of the output pixels in the cropping window;
        the sensor frame rate of the image sensor; and
        a maximum output pixel rate of the image sensor; and
    a processing unit monitoring viewing instructions from a user selecting a region of interest within the image corresponding to the portion of the working area, the processing unit dynamically communicating the viewing instructions to the windowing module such that the cropping window always encompasses the region of interest.

2. The live panning system according to claim 1, comprising a video engine unit receiving from the image sensor the pixel data of the output pixels corresponding to the cropping window, the video engine unit being configured to read out, in real-time, the pixel data of a number of pixels of interest from the output pixels to generate a video stream of interest, the pixels of interest corresponding to the region of interest identified by the user.

3. The live panning system according to claim 2, wherein the video engine unit comprises a cropping module in communication with the processing unit to receive therefrom the viewing instructions from the user and configured to move, in real-time, the region of interest within the cropping window on account of said viewing instructions from the user.

4. The live panning system according to claim 3, wherein the video engine unit further comprises a scaling module receiving the video stream of interest corresponding to the region of interest from the cropping module and scaling the same in accordance with a pixel resolution of a display unit displaying the live representation of the portion of the working area.

5. The live panning system according to claim 3, wherein the cropping module is configured to change, in real-time, a size of the region of interest within the cropping window on account of said viewing instructions from the user.

6. The live panning system according to claim 1, further comprising a display unit displaying, in real-time and at a display frame rate, a magnified video stream of the region of interest identified by the user, the magnified video stream being based on the sensor video stream generated by the image sensor and corresponding to the live representation of the portion of the working area.

7. The live panning system according to claim 1, wherein the windowing module is configured to change, in real-time, a size of the cropping window within the image on account of said viewing instructions from the user.

8. The live panning system according to claim 1, wherein the reduced pixel mode comprises at least one of:
    a binned-pixel mode wherein the image sensor outputs binned pixel data each corresponding to a combination of the pixel data of a cluster of the output pixels;
    a skipped-pixel mode wherein the image sensor outputs the pixel data of only a subset of the output pixels; and
    a scaled-pixel mode wherein the image sensor outputs a rescaled cropping window having a different width-to-height aspect ratio than the cropping window.

9. The live panning system according to claim 1, wherein the selected output mode is:
    the full-pixel mode if a product of the number of output pixels in the cropping window multiplied by the sensor frame rate is equal to or less than the maximum output pixel rate of the image sensor; and
    the reduced-pixel mode if the product of the number of output pixels in the cropping windows multiplied by the sensor frame rate of the image sensor is greater than the maximal output pixel rate of the image sensor.

10. The system according to claim 1, wherein the image sensor has a resolution of at least 5 megapixels.

* * * * *